US007765158B2

(12) United States Patent
Sugimoto et al.

(10) Patent No.: US 7,765,158 B2
(45) Date of Patent: Jul. 27, 2010

(54) PLAYBACK APPARATUS AND SERVER APPARATUS

(75) Inventors: Noriko Sugimoto, Takarazuka (JP); Yusuke Shimizu, Oaks, CA (US); Masayuki Kozuka, Arcadia, CA (US)

(73) Assignee: Panasonic Corporation, Osaka (JP)

( * ) Notice: Subject to any disclaimer, the term of this patent is extended or adjusted under 35 U.S.C. 154(b) by 1114 days.

(21) Appl. No.: 10/764,470

(22) Filed: Jan. 27, 2004

(65) Prior Publication Data
US 2005/0198115 A1 Sep. 8, 2005

(51) Int. Cl.
*G06Q 99/00* (2006.01)
(52) U.S. Cl. ........................................................ 705/51
(58) Field of Classification Search ............... 705/50–81
See application file for complete search history.

(56) References Cited

U.S. PATENT DOCUMENTS

| 5,598,276 | A | | 1/1997 | Cookson et al. |
| 5,691,972 | A | * | 11/1997 | Tsuga et al. ............. 369/275.3 |
| 5,903,705 | A | | 5/1999 | Yonemitsu et al. |
| 6,141,483 | A | * | 10/2000 | Yamada et al. ................. 386/46 |
| 7,239,417 | B2 | * | 7/2007 | Yoshii et al. ............... 358/1.18 |
| 2003/0016744 | A1 | | 1/2003 | Nakagawa |
| 2003/0090711 | A1 | * | 5/2003 | Yoshii et al. ............... 358/1.15 |
| 2003/0174837 | A1 | * | 9/2003 | Candelore et al. ........... 380/210 |

FOREIGN PATENT DOCUMENTS

| EP | 0 851 418 | 7/1998 |
| EP | 1 115 117 | 7/2001 |
| JP | 2002-163858 | 6/2002 |

OTHER PUBLICATIONS

Derfler, "How Networks Work", Bestseller Edition, 1996, Ziff-Davis Press, Emeryville, CA, all pages.*
White, "How Computers Work", Millennium Edition, 1999, Que Corporation, Indianapolis, IN, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*
International Search Report issued on Jul. 5, 2005 in International (PCT) Application No. JP2005/001548.
Sakamoto, et al., "Introduction of the Content ID Forum (cIDF)," Computer Society, Proceedings of the 2002 Symposium on Applications and the Internet (SAINT'02), 2002, pp. 1 and 2.

* cited by examiner

*Primary Examiner*—Andrew J. Fischer
*Assistant Examiner*—Jacob C. Coppola
(74) *Attorney, Agent, or Firm*—Wenderoth, Lind & Ponack, L.L.P.

(57) ABSTRACT

A playback apparatus judges whether a region code assigned to a BD-ROM matches a region code assigned to the playback apparatus. When the judgment result is in the affirmative, the playback apparatus plays back the content recorded on the optical disc. When the judgment result is in the negative, the playback apparatus does not play back the content, except when an exceptional playback is authorized. The exceptional playback is authorized when a combination of the content identifier of the content to be played back and the apparatus region code satisfies a predetermined condition defined by the owner of the rights of the content.

7 Claims, 23 Drawing Sheets

FIG.4

PLAYBACK AUTHORIZATION LIST

| | Content ID | Region Code | EXCLUSION INFORMATION | DISTRIBUTION COMPANY INFORMATION | RELEASE DATE INFORMATION |
|---|---|---|---|---|---|
| REPRODUCTION AUTHORIZATION INFORMATION 1 | 4GH | 1 | EXCLUSIVE | COMPANY AAA | 10/02/2002 |
| REPRODUCTION AUTHORIZATION INFORMATION 2 | 4GH | 2 | NON-EXCLUSIVE | COMPANY BBB | 01/23/2002 |
| REPRODUCTION AUTHORIZATION INFORMATION 3 | QW1 | 2 | EXCLUSIVE | COMPANY CCC | 01/24/1998 |

FIG.21
AUDIO OF ACCESS UNIT #100 ON BD | AUDIO OF ACCESS UNIT #100 IN UPDATE KIT
He had a person at one's nod. | 彼は人をアゴで使っている。

FIG.23A

US-RELEASE VERSION

PlayList#1 → PlayList#2 → PlayList#3

```
function{
 PlayPL(PL#1,PI#1);
 PlayPL(PL#2,PI#1);
 PlayPL(PL#3,PI#1);
}
```

FIG.23B

JAPAN-RELEASE VERSION  hb1  US-ORIENTED SCENE

PlayList#1 → PlayList#2 → PlayList#3

JPN-ORIENTED SCENE hb2 → PlayList#4

```
function{PlayPL(PL#1,PI#1)
if(SPRM(0)=="Japanese"){
PlayPL(PL#4,PI#1);
}else{
PlayPL(PL#2,PI#1);}
PlayPL(PL#3,PI#1);
}
```

DOWNLOAD

PLAYBACK APPARATUS AND SERVER APPARATUS

BACKGROUND OF THE INVENTION

1. Field of the Invention

The present invention relates to playback apparatuses and server apparatuses for optical discs, as well as a technique to distribute movie works via optical discs.

2. Description of the Related Art

Distribution of movie works, via optical discs, is one of the main sources of income of the movie businesses including, for example, the movie business of Hollywood. In order to be successful in the movie businesses, it is necessary to solve sensitive problems in each distribution area, such as problems related to the relationships with the distribution company in the distribution area, the release period of the movie in the distribution area, and the ethical, historical, or religious viewpoints in the distribution area. In order to solve these problems altogether, the region code system is used in DVDs and playback apparatuses. A region code indicates a region in which it is possible to play back the DVD. When a DVD is loaded, a playback apparatus reads the region code recorded on the DVD, and judges whether the region code matches the region code of the playback apparatus itself. When the read region code is in accordance, the DVD will be played back. When the read region code is not in accordance, the DVD will not be played back. Due to this region code system, DVDs are distributed only within the area where they are sold, and the distribution does not expand to outside the area represented by the appropriate region code. Accordingly, the aforementioned various sensitive problems are solved altogether.

Two DVDs having a same movie recorded thereon, for example, one distributed in Japan and the other distributed in the U.S.A., could be different in terms of their image qualities and interactive functions. More specifically, some of the DVDs for Japan undergo re-encoding of moving images so that subtitles and Japanese audio can be added. In such a case, the image quality is different from that of the DVDs for the U.S.A. In addition, sometimes an extra bonus called an Easter Egg and the interactive functions associated with the Easter Egg are provided only in the DVDs for the U.S.A. Because there are such differences, many of Japanese business persons who have been living in the U.S.A. for a long time collect and treasure U.S.A. versions of DVDs. When such a business person comes back to Japan and tries to play back the DVDs in his collection on the playback apparatus owned by his family, he finds out that the playback of those DVDs on the playback apparatuses in Japan are prohibited because of the difference in the region codes. Since he is not able to play back the DVDs on playback apparatuses in Japan, the value of his collection, which is personal property, is lowered. The drop in the value gives a bad impression to the user who has purchased the DVDs. It is, however, quit difficult to abolish the restraint with region code system because there are sensitive issues such as the one related to the relationship with the distribution companies in the distribution areas and the like.

BRIEF SUMMARY OF THE INVENTION

An object of the present invention is to provide a playback apparatus that does not lower the values of movie discs that a user has collected abroad while having sensitive problems solved such as the one related to the relationship with the distribution companies in the distribution areas and the ethical, historical, or religious viewpoints in the distribution areas.

In order to achieve the object, the present invention provides a playback apparatus for optical discs, comprising: a judging unit operable to judge whether a disc region code assigned to an optical disc matches an apparatus region code assigned to the playback apparatus; a reading unit operable to read a content identifier of a content recorded on the optical disc; and a playback unit operable to, (i) when the judging unit judges in the affirmative, play back the content, and (ii) when the judging unit judges in the negative, not play back the content except when an exceptional playback is authorized, wherein the exceptional playback is authorized when a combination of the content identifier read by the reading unit and the apparatus region code satisfies a predetermined condition defined by a right owner of the content.

According to this arrangement of the playback apparatus, even if the region code on the optical disc does not match the region code of the playback apparatus, it is possible to play back a content (a movie work) in a single form when predetermined conditions are satisfied. When the playback apparatus judges that the collection of works collected in the U.S.A. satisfies the predetermined conditions, it becomes possible to play the works back on a playback apparatus sold in Japan. In addition, in a case where it is not desirable to allow a particular content to be played back due to the relationship with the distribution company in the distribution target area, the predetermined conditions are not satisfied. Therefore, it is possible to protect the vested interest of the distribution company in the distribution target area. The copyright owner is not able to avoid aggravating the relationship with the distribution company in the area to which the playback apparatus belongs. Further, in a case where the release period of a content is different from one region to another in the world, it is possible to respect the release period designated to each region. Thus, the order of movie works distribution constructed with the region code system will not be disrupted.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 4 shows an example of a playback authorization list;

FIG. 21 shows how the audio is played back when the outputs are switched by the SPRM;

FIG. 23A shows the playback procedure with the dynamic scenario recorded on a BD-ROM; and FIG. 23B shows the playback procedure with the dynamic scenario included in an update kit.

DETAILED DESCRIPTION OF THE INVENTION

First Embodiment

Figure 1:
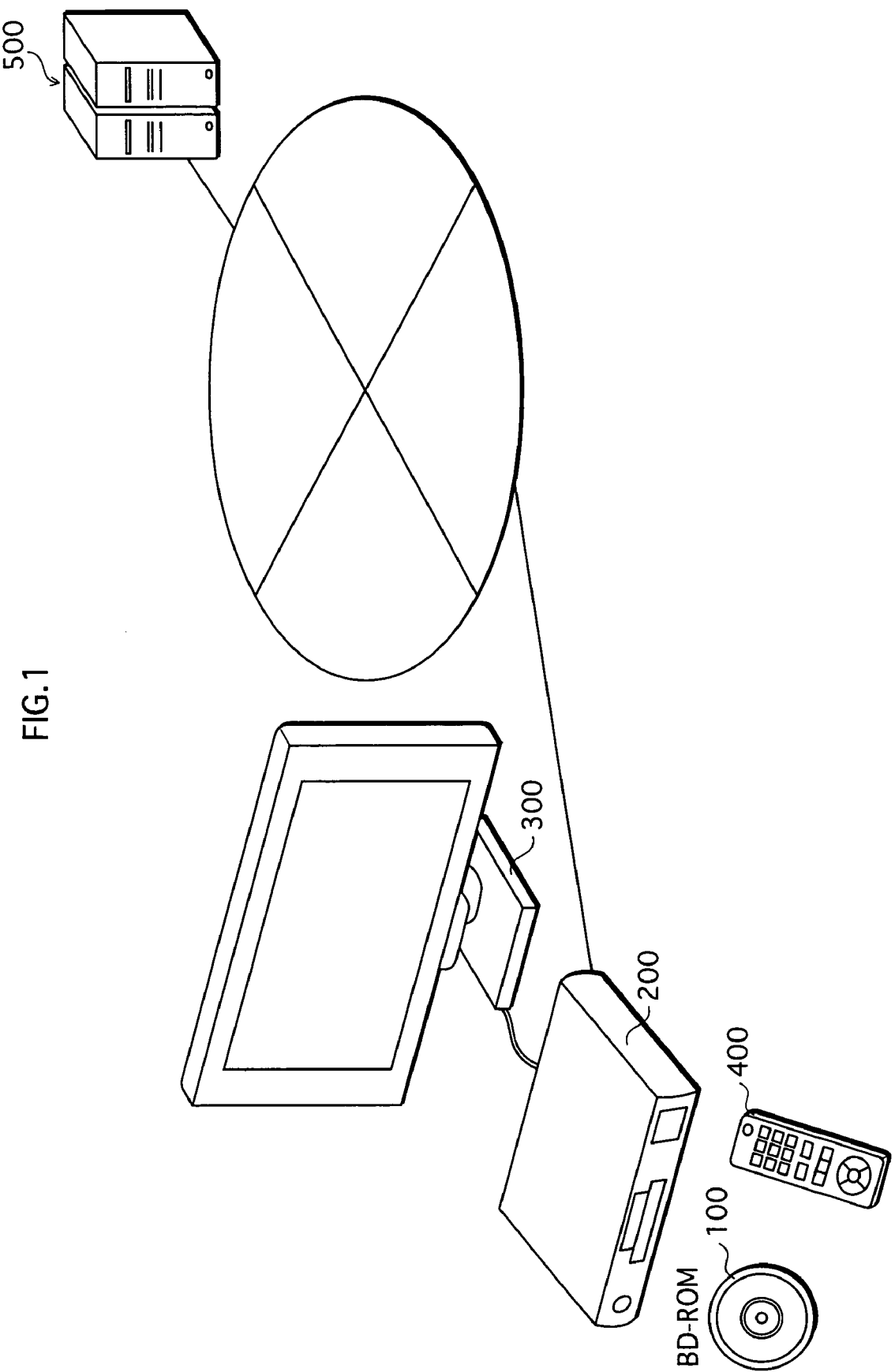
FIG. 1 is an embodiment of usage of the playback apparatus of the present invention.

The following describes embodiments of the playback apparatus of the present invention. First of all, among different actions with the playback apparatus of the present invention, an embodiment of usage will be explained. FIG. 1 shows an embodiment of usage of the playback apparatus of the present invention. In FIG. 1, the playback apparatus of the present invention is referred to as the playback apparatus 200. A home theater system is formed with the playback apparatus 200, a television 300, and a remote controller 400. The BD-ROM 100 is a recording medium to supply a movie work to this home theater system. The playback apparatus 200 serves to play back the contents recorded on the BD-ROM 100, according to a user operation on the remote controller 400.

The home theater system is characterized with that the playback apparatus 200 is connected with the server apparatus 500 via a network.

Figure 2:
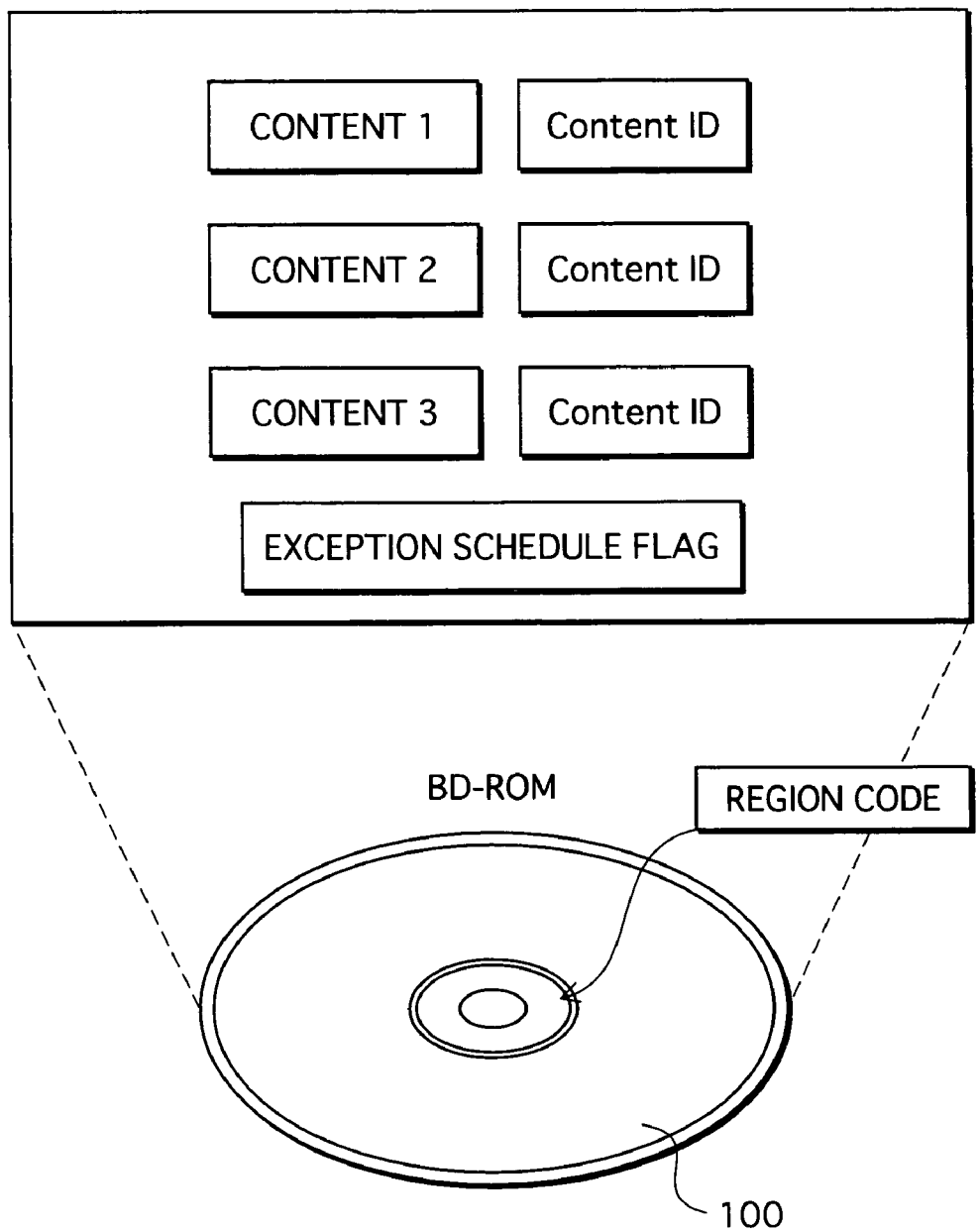
FIG. 2 shows the internal structure of a BD-ROM of the embodiment.

The following describes the BD-ROM in this home theater system. FIG. 2 shows the internal structure of the BD-ROM 100 of the present embodiment. The BD-ROM 100 shown in the drawing is a read-only optical disc on which one or more contents are recorded. A region code is recorded in the lead-in area, which is the innermost track of the BD-ROM 100. One or more contents (Content 1, Content 2, and Content 3) and an exception schedule flag are recorded in the volume area. The region code indicates a region in which it is possible to play back the BD-ROM 100. The contents are each in correspondence with a content-ID. The content-ID is an identifier that uniquely identifies a content. The exception schedule flag is a flag that indicates whether an exceptional playback is scheduled or not when the region code on the BD-ROM 100 does not match the region code of the playback apparatus 200.

Figure 3:
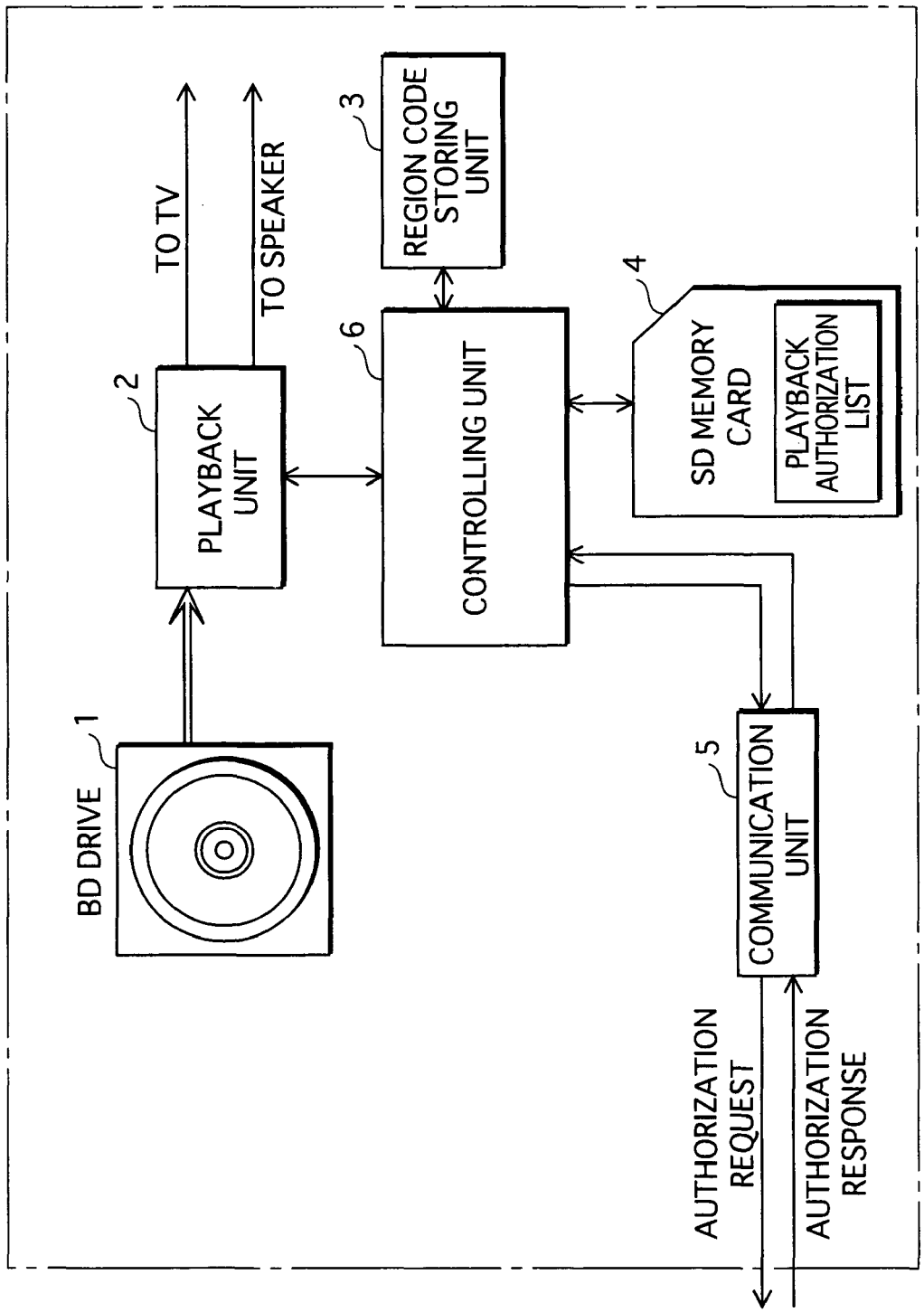
FIG. 3 shows the internal structure of the playback apparatus 200.

The following explains the internal structure of the playback apparatus 200. FIG. 3 shows the internal structure of the playback apparatus 200. As shown in the drawing, the playback apparatus 200 comprises: a BD drive 1; a playback unit 2; a region code storing unit 3; an SD memory card 4; a communication unit 5; and a controlling unit 6.

The BD drive 1 performs loading/ejecting of BD-ROMs, and accesses loaded BD-ROMs.

The playback unit 2 includes a video decoder for decoding moving images, an audio decoder for decoding audio, a graphics decoder for decoding subtitles, and plays back the contents recorded on BD-ROMs.

The region code storing unit 3 stores therein, in an unrewritable form, a region code assigned to a region in which the playback apparatus 200 is/was sold.

The SD memory card 4 is a secure recording medium in which a playback authorization list is stored. The playback authorization list includes a plurality of pieces of playback authorization information.

The communication unit 5 accesses a server apparatus 500 run by a copyright owner of a content and transmits an authorization request. The authorization request is made when both of the following conditions are satisfied: (i) the region code on the BD-ROM 100 does not match the region code of the playback apparatus 200, and (ii) the judgment result on playback authorization that is made with reference to the playback authorization list is non-authorization. The authorization request transmitted here includes the content-ID of the content, and the region code of the playback apparatus 200. It is arranged this way so that the authorization judgment with reference to the playback authorization information is made by the server apparatus 500.

The controlling unit 6 is a typical computer system that includes a CPU, a ROM having programs stored, and a RAM. The integrated control of the playback apparatus 200 is achieved through the CPU's reading of the programs stored in the ROM as well as the collaboration of the programs and hardware resources.

As additional information, the functional blocks such as the playback unit 2, the region code storing unit 3, the communication unit 5, and the controlling unit 6, are typically realized as an LSI. These functional blocks may be realized as LSIs individually. Alternatively, they may be realized as a system LSI that includes a part or all of them.

Further, the method for integration is not limited to LSIs, and it is also possible to realize the integration with a specialized processor or a general processor. Furthermore, when an alternative technique for making integrated circuits is available besides LSIs, due to development in semiconductor technology or another derivative technique, it would be possible to perform the integration using such a technique, needless to say.

The following explains the playback authorization list recorded on the SD memory card 4. FIG. 4 shows an example of playback authorization list. As shown in the drawing, the playback authorization list includes a plurality of pieces of playback authorization information.

Each piece of playback authorization information is a combination of a content-ID and a region code to which "exclusion information", "Distribution Company information", and "Release Date information" are attached. The combinations of a content-ID and a region code (4GH and 1; 4GH and 2; and QW1 and 2 in the drawing) each indicate that authorization to play back the content identified with the content ID is given to the playback apparatuses 200 in the region identified with the region code.

In each piece of playback authorization information, "exclusion information", "Distribution Company information", and "Release Date information" that are attached to the combination of a content-ID and a region code indicates the conditions of authorization for the combination.

"Exclusion information" indicates that the authorization to play back the content is given exclusively to the playback apparatus 200 in the combination. An authorization conditioned by a piece of exclusion information is exclusive (i.e., the authorization to play back the content will not be given to other playback apparatuses identified with the region codes in the other combinations). Among the combinations shown in the playback authorization list, when a playback authorization is given to a content in a combination to which a piece of exclusion information is attached, other combinations that include the content-ID of the same content will be deleted from the playback authorization list. Those other combinations will be deleted, even if they each have a piece of exclusion information attached thereto. With this arrangement of control, even if playback is requested in three different regions in the world, when a playback authorization is given to one region, playback in other regions will not be authorized. Therefore, it is possible to limit the exceptional playback authorization to only one region. On the other hand, when the exclusion information indicates as "non-exclusive" (this is the default setting), the aforementioned deletion of playback authorization information will not be performed. In such a case, more than one authorization for an exceptional playback can be provided.

"Distribution Company information" shows who is the distributor in the region identified with the region code in each combination (Company AAA, Company BBB, and Company CCC in the drawing). When a movie work is distributed to all over the world, the copyright owner enters into a contract with the distributor in each region so that the distribution of the movie work in the region is monopolistically performed by the distributor. Here, for example, the vested interest of the distributor would be damaged when a BD-ROM 100 sold in another region is brought into the region that is under the control of the distributor. It is quite possible that the relationship with the distributor gets aggravated.

Thus, in the playback authorization information, "Distribution Company information" is provided for each combination of a content-ID and a region code. When an exceptional playback is to be performed, it is judged whether the Distribution Company information on the BD-ROM 100 matches the Distribution Company information of the playback apparatus 200. When the Distribution Company information on the BD-ROM 100 does not match the Distribution Company information of the playback apparatus 200, playback is prohibited since there is a chance that the vested interest of the distribution company in the region to which the playback apparatus 200 belongs may be damaged. When the Distribution Company information on the BD-ROM 100 matches the Distribution Company information of the playback apparatus 200, and the distributors in both regions are the same, there is no vested interest to be damaged. Therefore, playback is authorized. Thus, the exceptional playback is performed within the range in which the vested interest of the distributor is not damaged.

"Release Date information" indicates when the content is released in the region identified with the region code in each combination (10/2/2002; 01/23/2002; and 01/24/1998 in the drawing). When the current time clocked in the playback apparatus 200 is past the release date, playback is authorized. When the current time is not past the release date, playback is unauthorized. The Release Date information as this is essential to respecting a business method called "time shift". "Time shift" is a business method by which the time to distribute optical discs in the non-English-speaking world is delayed, for example, the optical discs are distributed to the U.S.A. first, and then to the Western Europe and Japan, and then to the Eastern Europe and the rest of Asia. When a BD-ROM 100 to be played back is brought in from another region, it is not desirable that the contents on the BD-ROM 100 can be played back before the release date for the region to which the playback apparatus belongs. Hence, the Release Date information is attached to the playback authorization information so that such an ahead-of-release playback can be prevented.

The structure of the playback authorization list has been explained so far. The following explains the processing procedure performed by the controlling unit 6 with the use of the playback authorization list.

Figure 5:
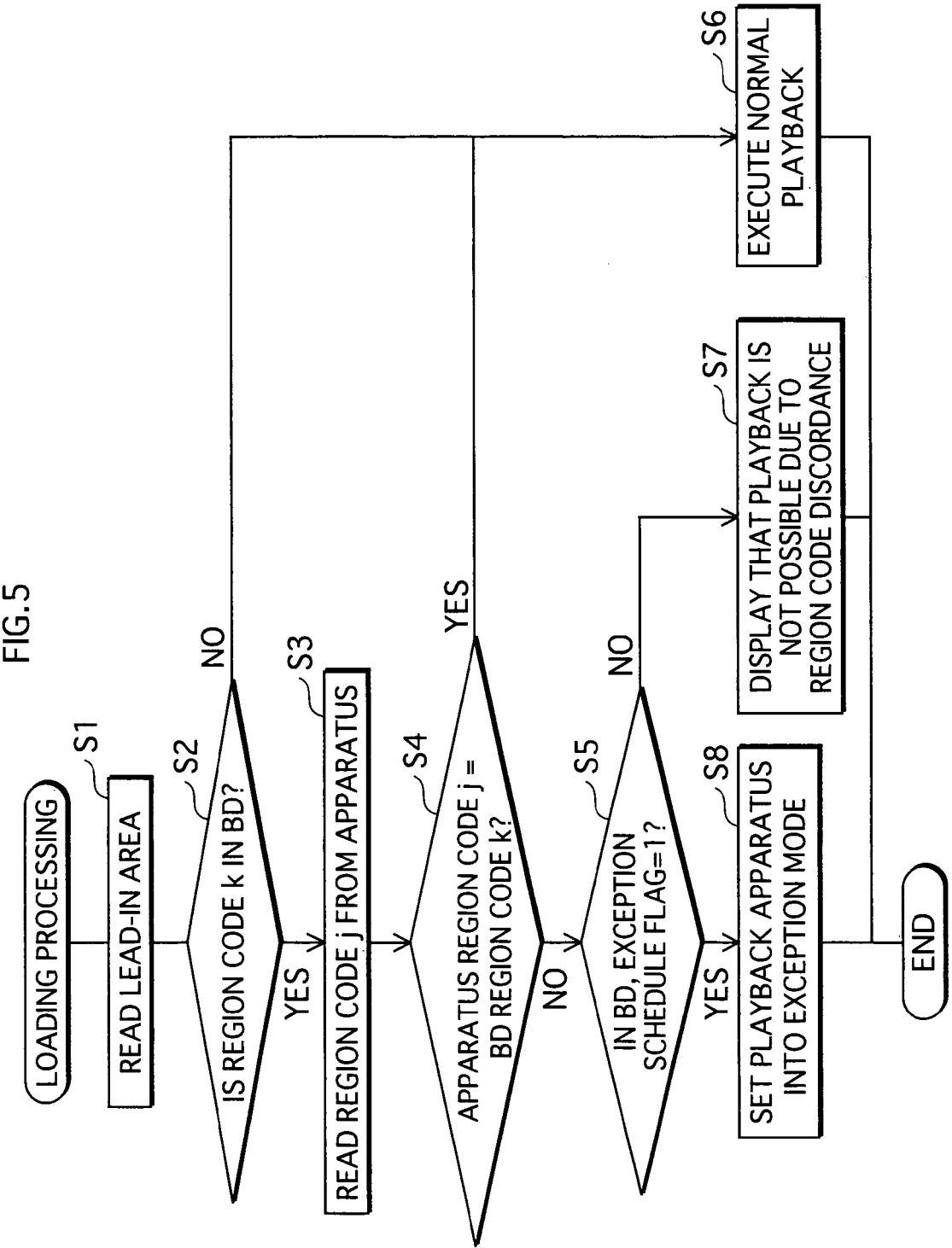
FIG. 5 is a flow chart showing the procedure of the loading processing.

FIG. 5 is a flow chart showing the procedure of the loading processing.

The loading processing is to read the lead-in area in Step S1, and to perform Steps S2 through S5 before one of the Steps S6, S7, and S8 is selectively performed.

In Step S6, the playback apparatus is set into the exception mode. Step S7 is an error processing in which it is displayed that playback is not possible due to disaccord of the region codes. Step S8 is a processing for executing the normal playback.

In Steps S2 through S5, the judgment as to which one of these three kinds of processing should be executed is determined.

In Step 2, it is judged whether there is a region code on the BD. When the judgment result is "Yes" in Step S2, the region code of the playback apparatus is read (Step S3). Here, the BD-ROM region code to be read will be referred to as the region code k, whereas the apparatus region code will be referred to as the region code j. In Step S4, it is judged whether the region code j matches the region code k on the BD. In this procedure, when the judgment result in Step S2 is "No", and the judgment result in Step S4 is "Yes", the processing in Step S6 will be performed. When the judgment result in Step S4 is "No", the processing in Step S5 will be performed.

In Step S5, it is judged whether the exception schedule flag on the BD is "1" or not. When the flag is "1", an error processing is performed in Step S7. When the flag is "0", the playback apparatus 200 is set into the exception mode.

Figure 6:
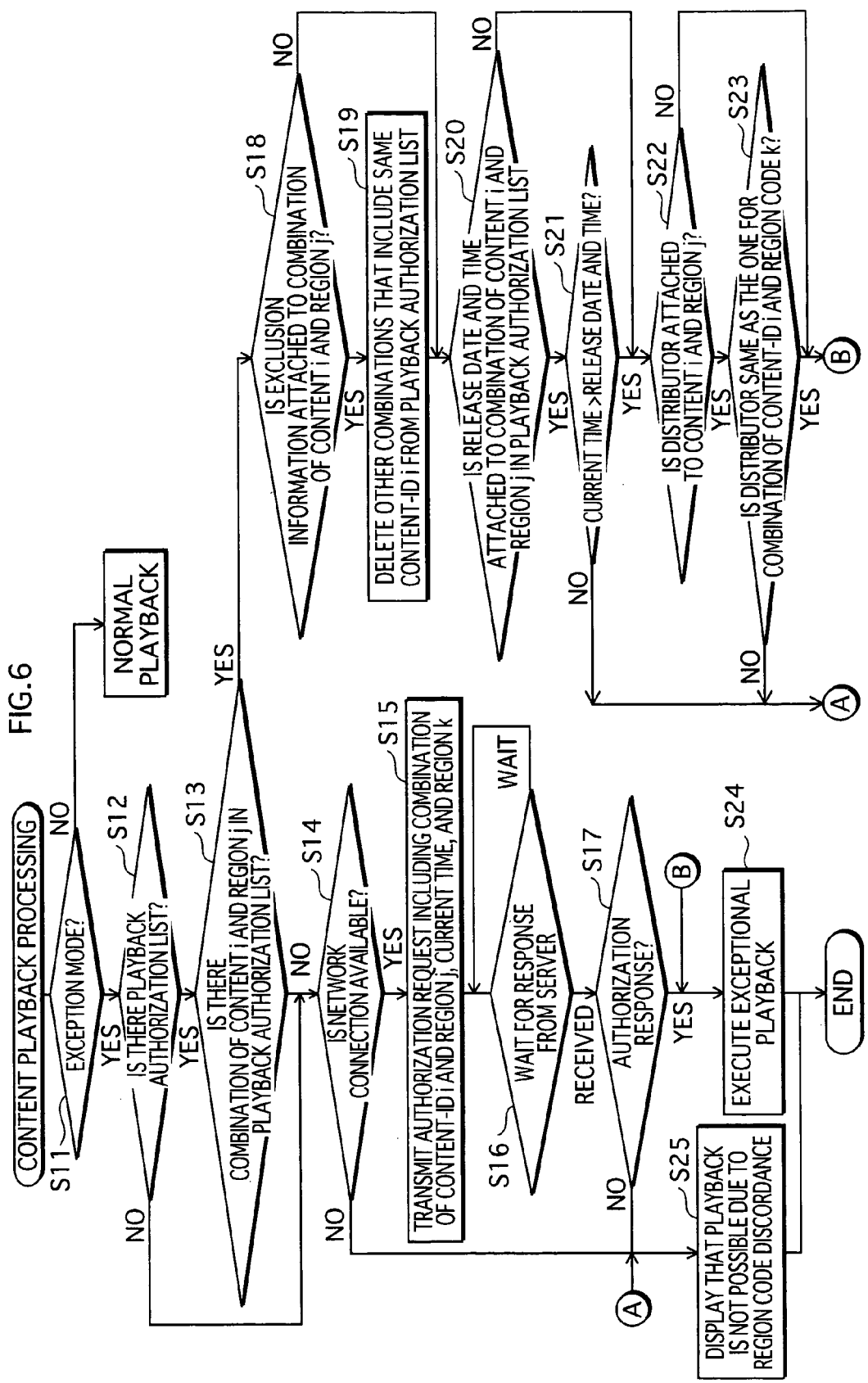
FIG. 6 is a flow chart showing the procedure of the content playback processing.

FIG. 6 is a flow chart showing the procedure of the content playback processing. In this flow chart, the content recorded on the BD-ROM 100 being a playback target will be referred to as the content i. Firstly, it is judged whether the apparatus is in the exception mode or not (Step S11). When it is not in the exception mode, the normal playback will be performed. When it is in the exception mode, either the exceptional playback will be performed (Step S24) after the processing in Steps S12 through S23, or it will be displayed that the playback is not possible due to disaccord of the region codes (Step S25).

In Step S12, it is judged whether there is a playback authorization list or not. In Step S13, it is judged whether there is a combination of the content-ID i and the region code j is included in the playback authorization list.

When the judgment result in Step S12 is "No", or when the judgment result in Step S12 is "Yes" but the judgment result in Step S13 is "No", it is judged whether an exceptional playback can be authorized or not in Steps S14 through S17. The processing in Steps S14 through S17 is a procedure performed in a case where the server apparatus 500 makes judgment on playback authorization.

On the other hand, when the judgment result in Step S13 is "Yes", it is judged whether an exceptional playback can be authorized or not in Steps S18 through S23. The processing in Steps S18 through S23 is a procedure performed in a case where judgment on playback authorization is made according to the playback authorization list.

First, explanation is provided on the playback authorization judgment made by the server apparatus. In Step S14, it is judged whether a network connection is possible or not. When the judgment result in this step is "No", an error processing is performed in Step S25.

When the judgment result in this step is "Yes", the processing in Step S15 and later will be performed.

In Step S15, an authorization request is transmitted, the authorization request including the combination of the content-ID i and the region code j, the current time, and the region code k. In Step S16, a response from the server apparatus 500 is awaited. In Step S17, it is judged whether a response from the server apparatus 500 is an authorization response or not. When it is an authorization response, an exceptional playback is performed in Step S24. When it is a non-authorization response, an error processing is performed in Step S25.

It should be noted that, when an authorization request is transmitted in Step S15 in FIG. 6, the current time on the playback apparatus 200 and the region code on the BD-ROM 100 are also transmitted in addition to the combination of the content-ID and the region code. It is arranged this way so that such judgments are made by the server apparatus as to (i) whether the release date of the content in the region to which the playback apparatus 200 belongs is already past and (ii) whether the distributor in the region to which the playback apparatus 200 belongs matches the distributor in the region of the BD-ROM 100.

Next, the following explains the playback authorization judgment made according to the playback authorization list.

In Step S18, it is judged whether exclusion information is attached to the combination of the content-ID i and the region code j. When a piece of exclusion information is attached, other combinations that include the same content ID i are deleted from the playback authorization list (Step S19).

In Step S20, it is judged whether a release date is attached to the combination of the content ID i and the region code j in the playback authorization list. In Step S22, it is judged whether a piece of Distribution Company information is attached to the combination of the content ID i and the region code j. When neither of these kinds of information is attached, the judgment result in Step S20 is "No", and the judgment result in Step S22 is "No", and an exceptional playback is performed in Step S24.

When one of these kinds of information is attached, the judgments in Steps S21 and S23 are made. In Step S21, it is judged whether the current time is past the release date or not. When the current time is not past the release date, the judgment result in Step S21 is "No", and an error processing is performed in Step S25.

In Step S23, it is judged whether the distributor for the combination of the content-ID i and the region code j matches the distributor for the combination of the content-ID i and the region code k. When they do not match each other, the judgment result in Step S23 is "No", and an error processing is performed in Step S25.

Figure 7:
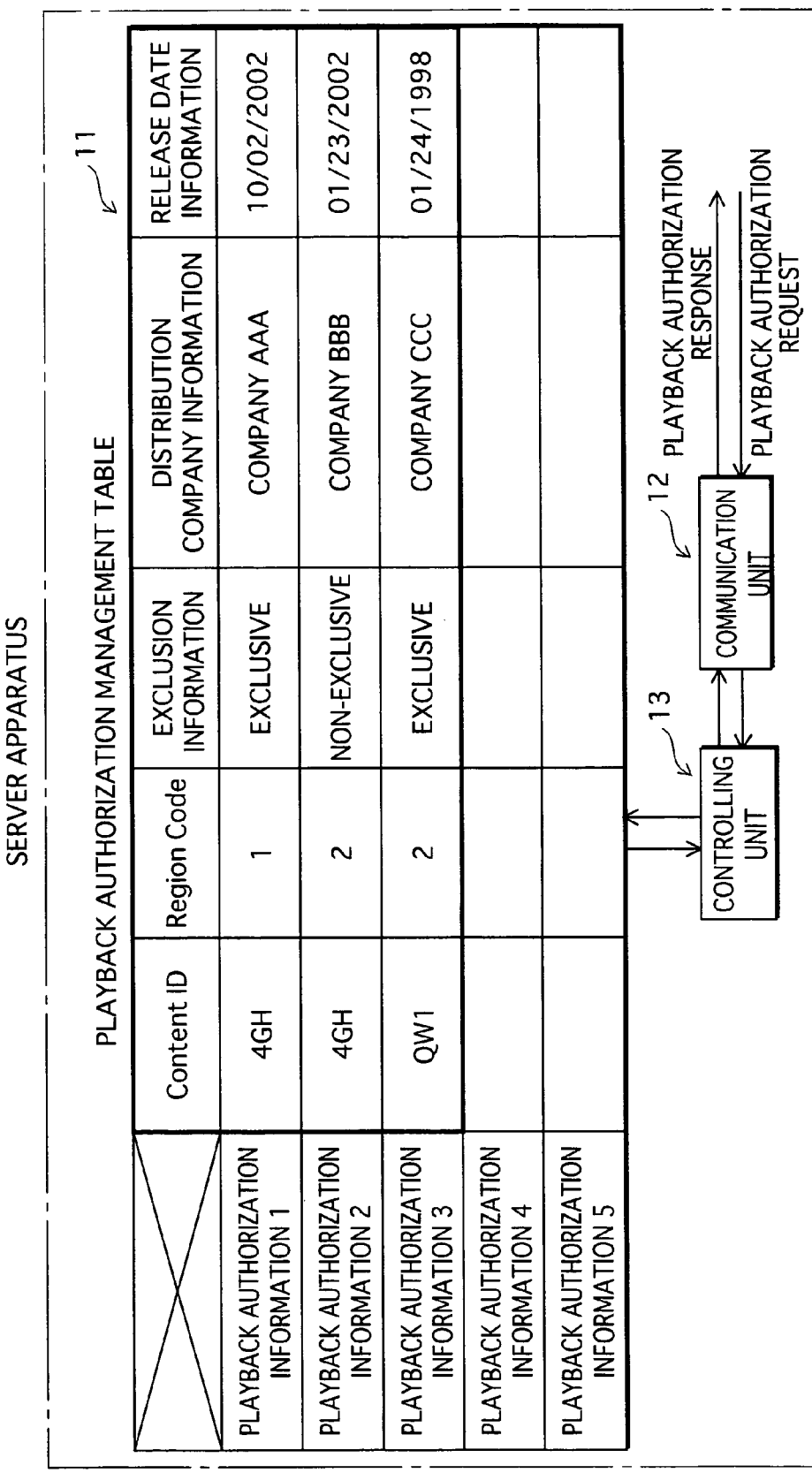
FIG. 7 shows the inside of the server apparatus.

The following is explanation on the server apparatus 500. FIG. 7 shows the inside of the server apparatus 500. As shown in the drawing, the server apparatus 500 includes a playback authorization management table 11, a communication unit 12, and a controlling unit 13.

The playback authorization management table 11 includes a plurality of pieces of playback authorization information, similar to that of the playback authorization list. These pieces of playback authorization information shows information on the combinations made up of each of a plurality of contents which are under the control of the copyright owner and each of a plurality of regions to be distribution target areas of movie works. Although there is a difference in the scale of the amounts of information, the items written in the playback authorization management table 11 are not different from those written in the playback authorization list. It is fair to say that the playback authorization list in the playback apparatus is part of the playback authorization management table 11 in the server apparatus. Since the playback authorization list is a part of the playback authorization management table 11, it is possible for the playback apparatus to request, to the server apparatus 500, a download of the playback authorization list which is a part of the playback authorization management table 11. It would be preferable that such a download is performed based on a URL or the like recorded on the BD-ROM 100. The reason for this is that each server apparatus 500 is run by the copyright owner of the content, and therefore server apparatuses are different from one copyright owner to another. Thus, it is preferable to uniquely specify a server apparatus 500 on the BD-ROM 100. As for the URLs of some major copyright owners (distributors), it is acceptable to have those URLs stored in playback apparatuses. Alternatively, it is also acceptable to download URLs from the sites of manufacturers of playback apparatuses.

The communication unit 12 performs communication with the playback apparatus 200 via a network.

Figure 8:
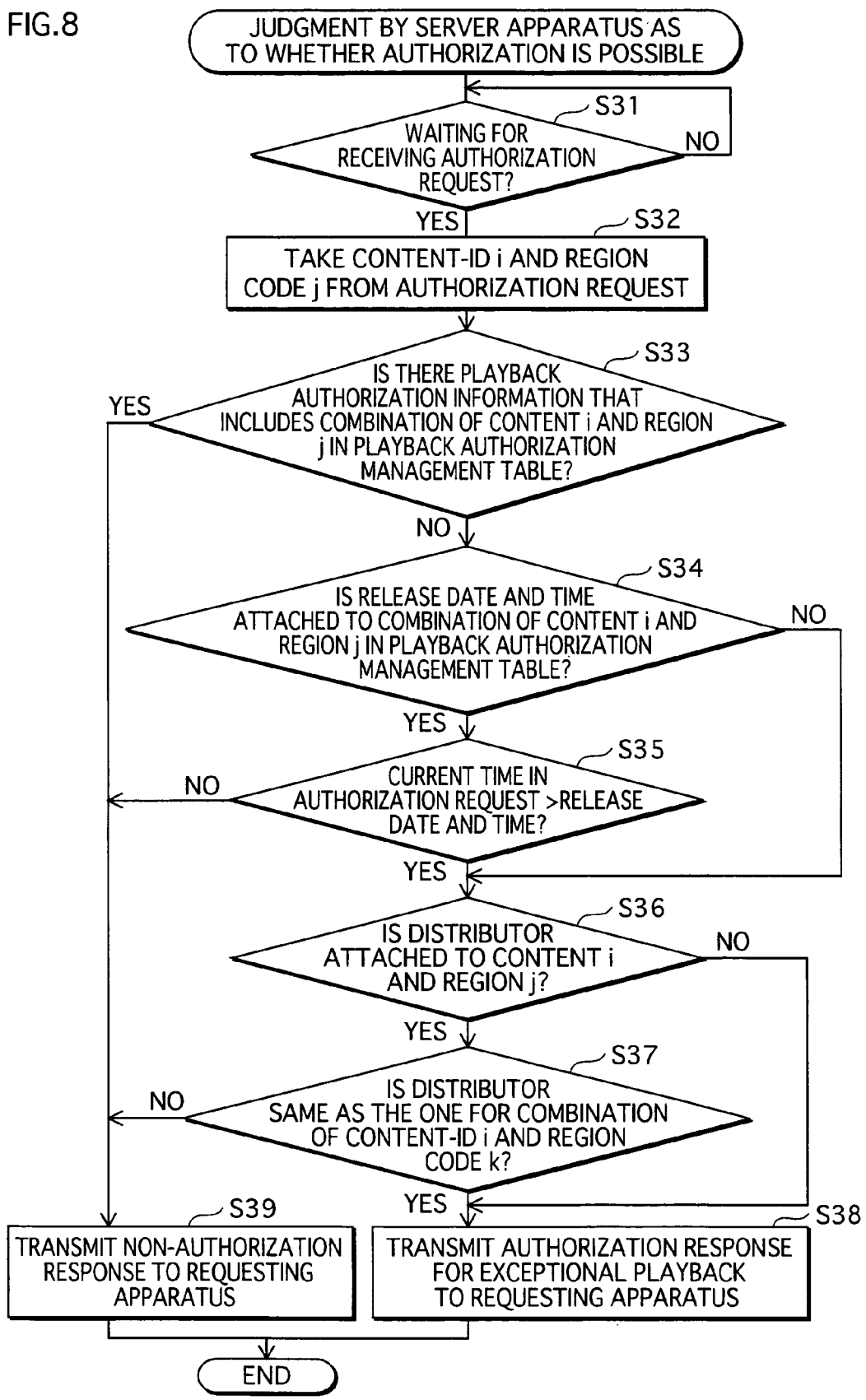
FIG. 8 is a flow chart showing the procedure of the processing by the controlling unit 13.

When an authorization request has been transmitted from the playback apparatus 200, the controlling unit 13 judges whether the authorization request will be authorized or not by referring to the playback authorization management table 11. When the request is to be authorized, an authorization response will be transmitted to the playback apparatus 200 being the source of the request. When the request is not to be authorized, a non-authorization response will be transmitted to the playback apparatus 200 being the source of the request. The controlling unit 13 is realized by writing a program that executes the flow chart shown in FIG. 8 and having the server computer execute the program. FIG. 8 is a flow chart showing the procedure of the processing by the controlling unit 13. In this flow chart, firstly receiving an authorization request is waited for in Step S31, and when an authorization request has been received, the content-ID i and the region code j are taken out from the authorization request in Step S32.

Subsequent processing performs the processing either in Step S38 or Step S39 depending on the results in Steps S32 through S37. Here, in Step S38, an authorization response for an exceptional playback is transmitted to the playback apparatus 200 being the source of the request. In Step S39, a non-authorization response is transmitted to the playback apparatus 200 being the source of the request. The processing in Steps S32 through S37 determines which one is to be executed, Step S38 or Step S39.

In Step S33, it is judged whether a piece of playback authorization information including a combination of the content-ID i and the region code j exists in the playback authorization management table 11 or not. When it does not exist in the table 11, the procedure advances to Step S39, where a non-authorization response is transmitted.

In Step S34, it is judged whether a release date is attached to the combination of the content-ID i and the region code j in the playback authorization management table 11. In Step S36, it is judged whether a piece of Distribution Company information is attached to the combination of the content-ID i and the region code j. When neither of these kinds of information is attached, the judgment result in Step S34 is "No", and the judgment result in Step S36 is "No", and an authorization response for an exceptional playback is transmitted to the apparatus being the source of the request in Step S38.

When one of these kinds of information is attached, the judgments in Steps S35 and S37 are made. In Step S35, it is judged whether the current time is past the release date or not. When the current time is not past the release date, the judgment result in Step S35 is "No", and an error processing is performed in Step S39.

In Step S37, it is judged whether the distributor for the combination of the content-ID i and the region code j (the region code of the playback apparatus 200) matches the distributor for the combination of the content-ID i and the region code k (the region code on the BD-ROM 100). When they do not match each other, the judgment result in Step S37 is "No", and an error processing is performed in Step S39.

According to the present embodiment as explained above, even if the region code on the BD-ROM 100 does not match the region code of the playback apparatus 200, it is possible to playback a content in a single form when predetermined conditions are satisfied. When the playback apparatus 200 judges that some of the contents included in the collection obtained in the U.S.A. satisfy the predetermined conditions, it is possible to play them back on a playback apparatus 200 sold in Japan. When it is not desirable to allow the contents to be played back, with regard to the relationship with distribution companies in the region being the distribution target, the predetermined conditions are not satisfied. Therefore, it is possible to protect the vested interest of the distribution company in the region being the distribution target. Thus, the copyright owner is able to avoid aggravating the relationship with the distribution company in the area to which the playback apparatus 200 belongs. Further, in a case where the release periods of a content are different from one region to another in the world, it is possible to respect the release period designated to each region. Thus, the order of movie works distribution constructed with the region code system will not be disrupted.

Second Embodiment

The present embodiment discloses more in detail the format of a BD-ROM 100.

Figure 9:
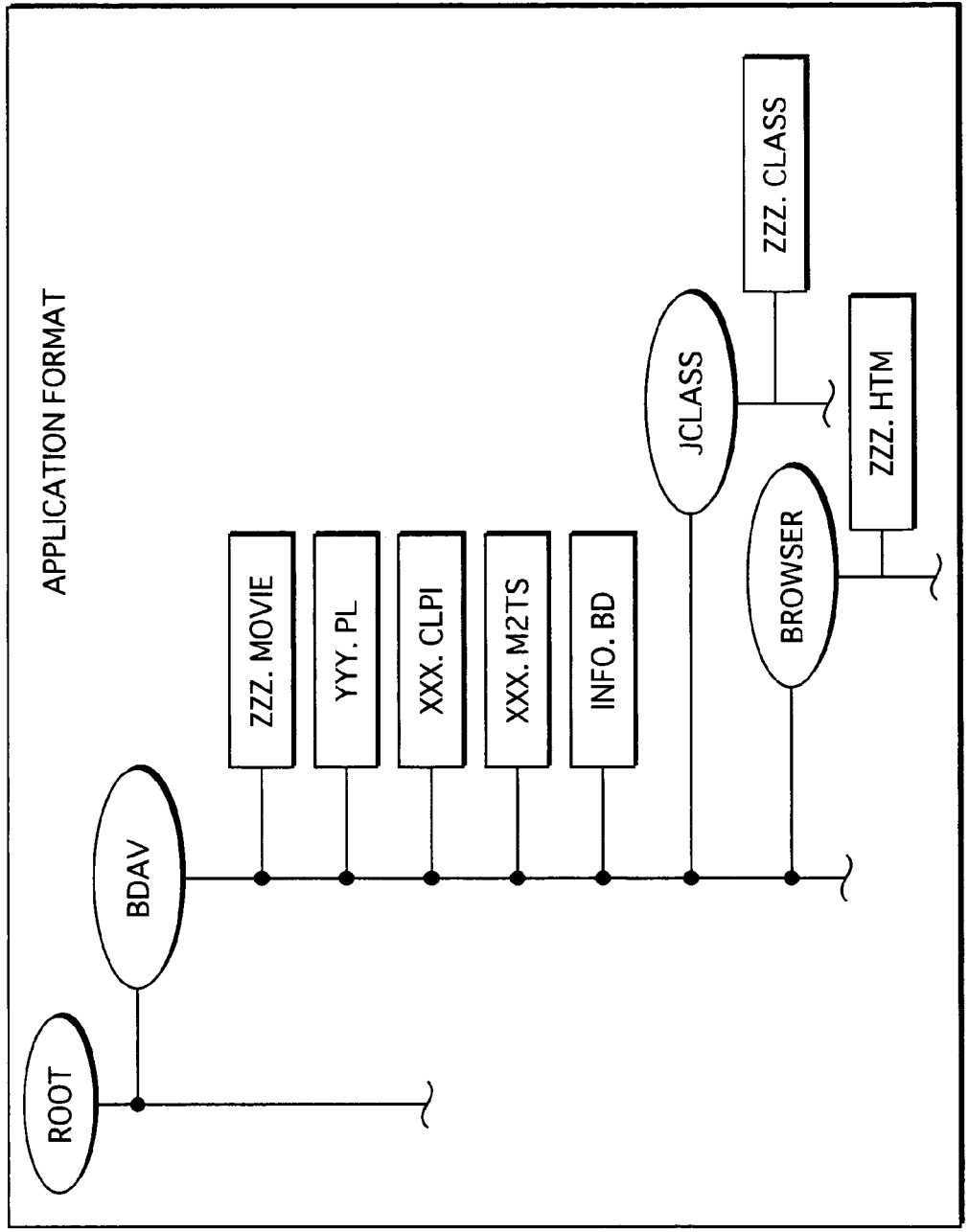
FIG. 9 represents an application format of a BD-ROM using a directory structure.

FIG. 9 expresses an application layer format of a BD-ROM 100 using a directory structure. As shown in FIG. 9, below a ROOT directory in the BD-ROM 100 is a BD-AV directory, and below the BD-AV directory is a JCLASS directory and a BROWSER directory. Subordinate to the BD-AV directory exist the following files: INFO.BD, XXX.M2TS, XXX.CLPI, YYY.PL, and ZZZ.MOVIE. Subordinate to the JCLASS directory is disposed ZZZ.CLASS, and subordinate to the BROWSER directory is disposed ZZZ.HTM.

Figure 10:
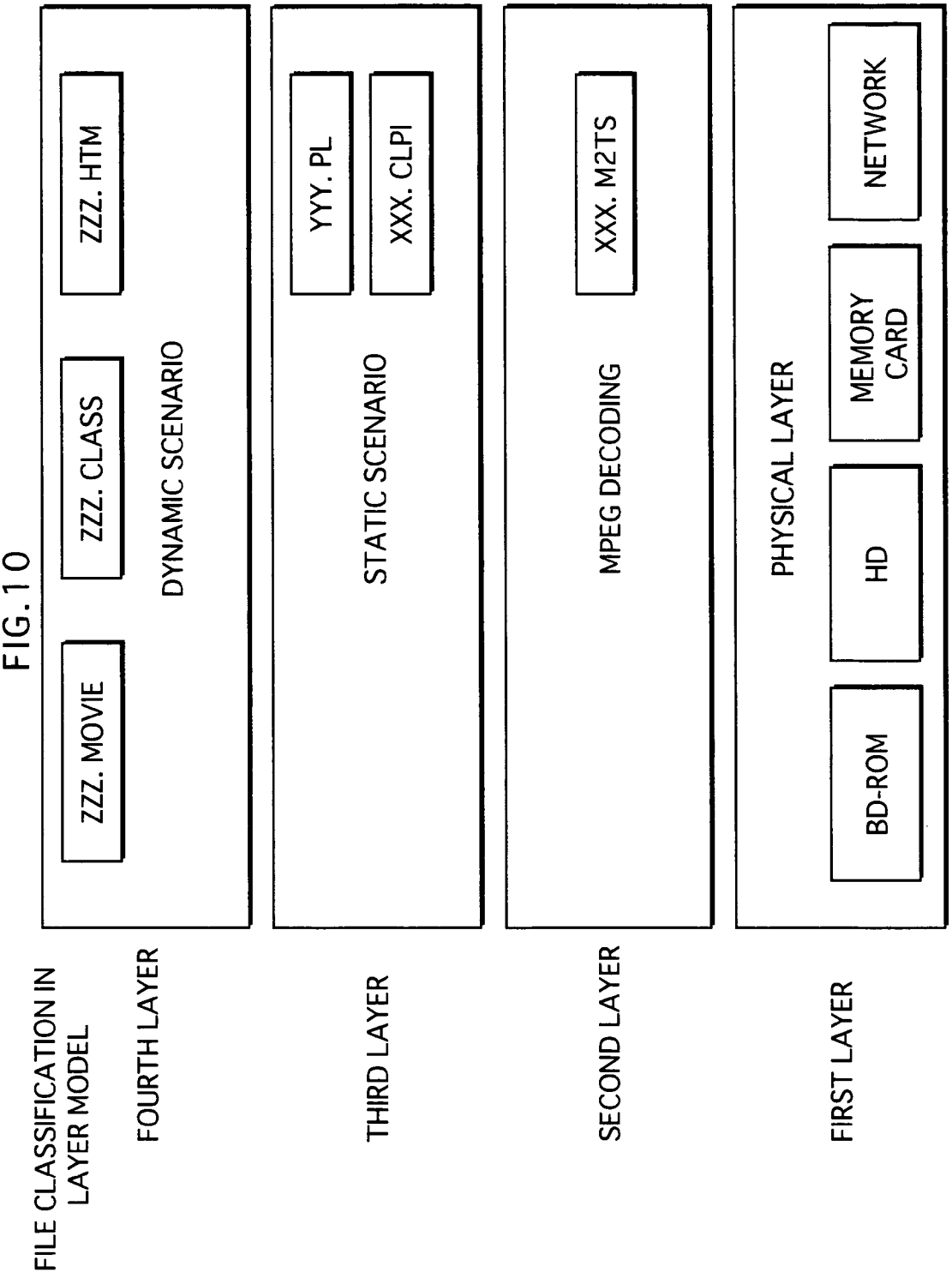
FIG. 10 is a classification diagram showing files classified in terms of functionality.

FIG. 10 is a classification diagram of when these files are classified from a functionality viewpoint. In FIG. 10, the hierarchy formed from the first, second, third and fourth layers symbolically shows the classifications in the diagram. In FIG. 10, XXX.M2TS is grouped in the second layer. XXX.CLPI and YYY.PL are grouped in the third layer (static scenarios). ZZZ.MOVIE, which is subordinate to the BD-AV directory, ZZZ.CLASS, which is subordinate to the JCLASS directory, ZZZ.HTM, which is subordinate to the BROWSER directory are grouped in the fourth layer.

Figure 11:
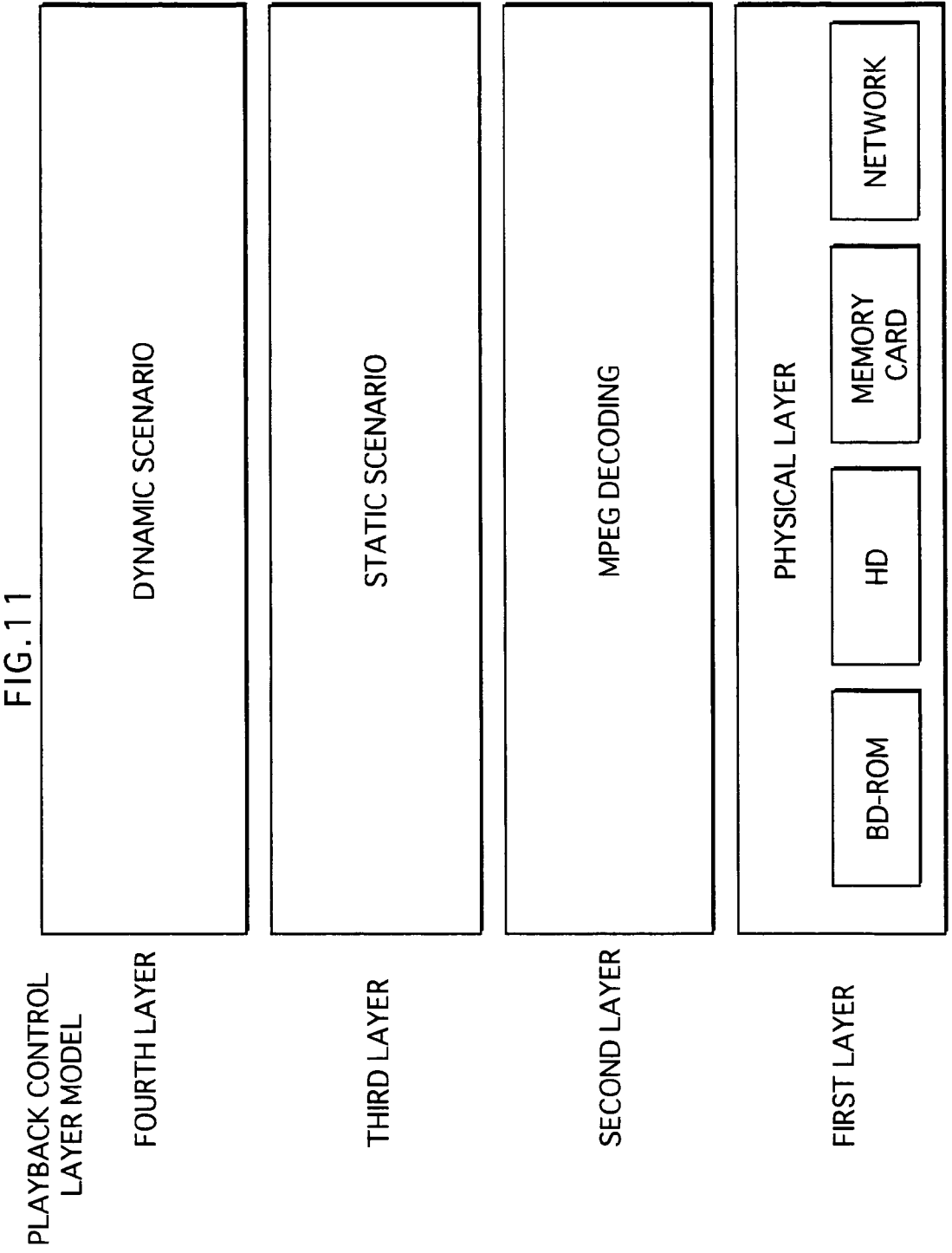
FIG. 11 shows a layer model targeted by a BD-ROM.

The classifications in FIG. 10 (the first to fourth layers) target a layer model such as shown in FIG. 11. A layer model in control software that is targeted by a BD-ROM is described below while referring to FIG. 11.

The first layer in FIG. 11 is a physical layer in which supply controls relating to streams targeted for processing are implemented. As shown in the first layer, target streams have as their supply source not only BD-ROMs but also HDDs (hard disk drives), memory cards, networks and other kinds of recording and communication media. Controls (disk access, card access and network communication) directed towards the supply source such as HDDs, memory cards and networks are implemented on the first layer.

The second layer is a decoding format layer. This second layer is where the decoding format used in decoding streams supplied by the first layer is defined. The MPEG-2 decoding format is employed in the present embodiment.

The third layer (static scenarios) defines the static scenarios of streams. Static scenarios are playback path information and Clip information defined in advance by the disk creator, the third layer (static scenarios) being where playback controls based on these static scenarios are defined.

The fourth layer is for realizing dynamic scenarios in streams. Dynamic scenarios are scenarios for dynamically changing the progress of playback as a result of user operations, the apparatus status, and the like, the fourth layer being where playback controls based on these dynamic scenarios are defined. Files relating to streams, static scenarios, and dynamic scenarios are described below in accordance with this layer model.

Firstly, a stream (XXX.M2TS) belonging to the second layer is described.

Figure 12:
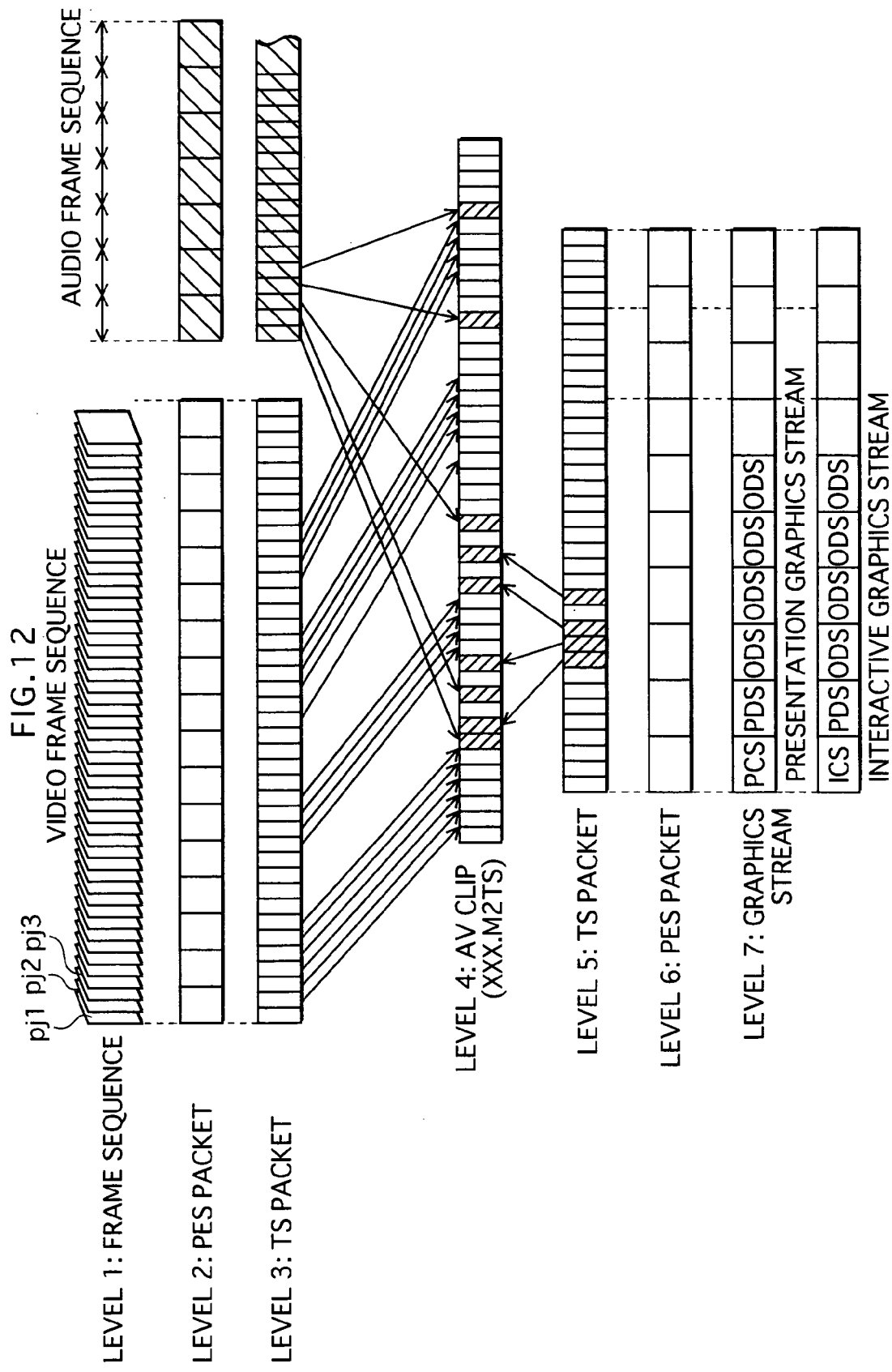
FIG. 12 schematically shows how an AV clip is structured.

AVClip (XXX.M2TS) is an MPEG-TS (transport stream) format digital stream obtained by multiplexing a video stream, one or more audio streams, and one or more graphics streams, presentation graphics streams, and interactive graphics streams. Video streams show the moving image portions of a movie, audio streams show the audio portions of a movie, presentation graphics streams show the subtitles of a movie, and interactive graphics streams show procedures involved in dynamic playback controls that target menus. FIG. 12 schematically shows how an AVClip is constituted.

An AVClip ($4^{th}$ level) is formed by converting a video stream comprising a plurality of video frames (pictures pj1, pj2, pj3) and an audio stream comprising a plurality of audio frames ($1^{st}$ level) into a PES packet string ($2^{nd}$ level), which is then converted to TS packets ($3^{rd}$ level). Likewise, a presentation graphics stream and an interactive graphics stream ($7^{th}$ level) are converted to a PES packet string ($6^{th}$ level), which is converted to TS packets ($5^{th}$ level), and the TS packets are then multiplexed. The multiplexing involves arranging TS packets storing video frames and TS packets storing audio frames, so that audio frames are positioned close to video frames that are to be read from the BD-ROM 100 at the same time as the audio frames.

AVClips generated through the above process are portioned into a plurality of extents and recorded in an area of a BD-ROM 100, in the same manner as normal computer files. An AVClip comprises one or more ACCESS UNITs, and can be cued in these ACCESS UNITs. An ACCESS UNIT is the smallest decoding unit that includes a single GOP (group of pictures) and audio frames to be read at the same time as the GOP. GOPs include bi-directionally predictive (B) pictures, which are compressed using time-correlation characteristics with images to be played in a past direction and a future direction, predictive (P) pictures, which are compressed using time-correlation characteristics with images to be played in a past direction, and intra (I) pictures, which are compressed using spatial-frequency characteristics (i.e., not time-correlation characteristics) in the images of individual frames.

Moreover, the filename "XXX" in XXX.M2TS abstracts the 3-digit identification number appended to the AVClip in the BD-ROM 100. That is, the AVClip in FIG. 12 is uniquely identified using the "XXX". Thus completes the description of the stream (XXX.M2TS). It should be noted that the 3-digit number referred to here is merely exemplary, and may be any length.

Static Scenarios

The file (XXX.CLPI, YYY.PL), which is a static scenario, is described next.

Figure 13:
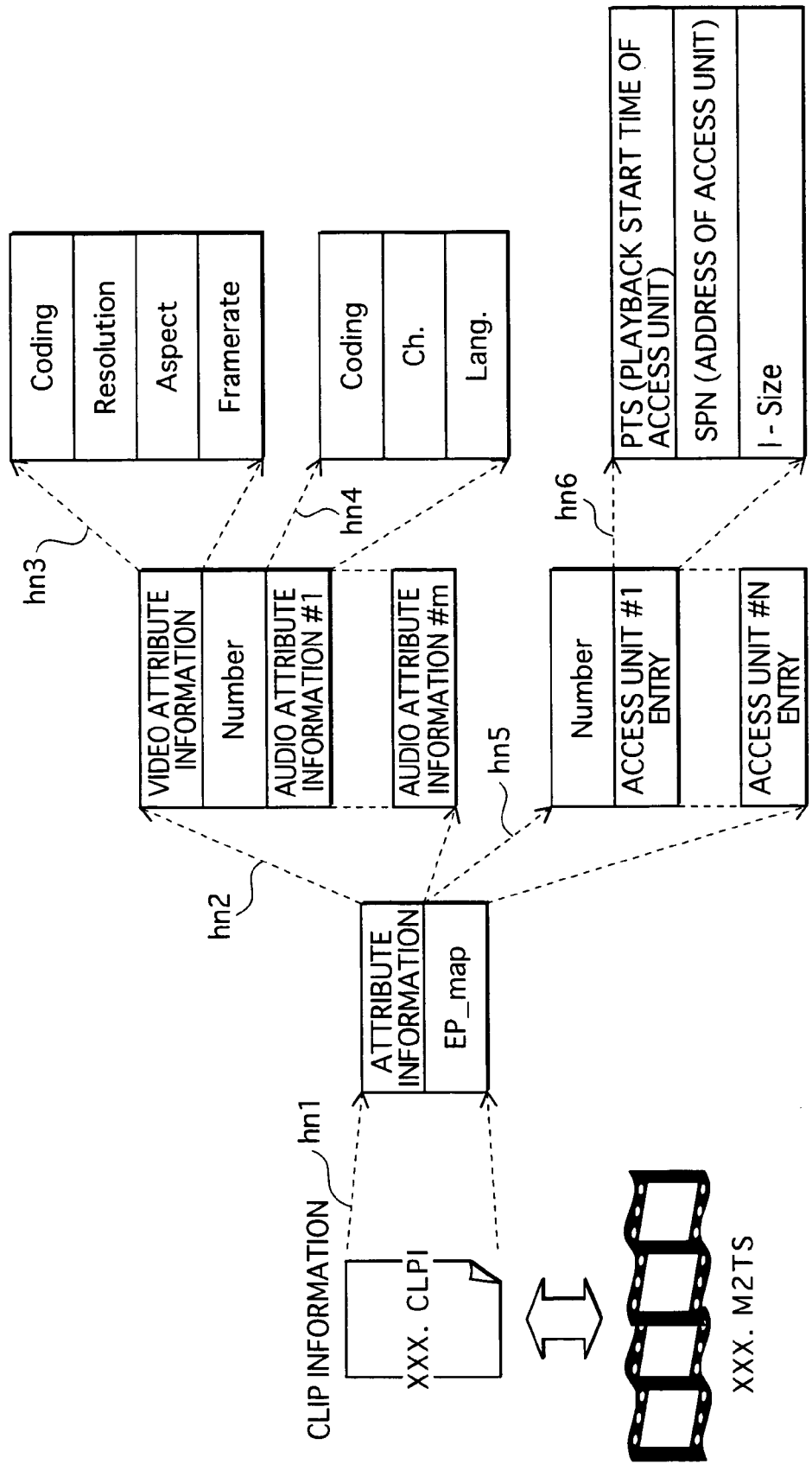
FIG. 13 shows an internal structure of Clip information.

Clip information (XXX.CLPI) is management information relating to individual AVClips. FIG. 13 shows an internal structure of Clip information. AVClips are obtained by multiplexing video and audio streams, and since AVClips can be cued in ACCESS UNITs, management items of the Clip information include what attributes the video and audio streams have and where the cue positions are in the AVClips. The leaders in FIG. 13 highlight the Clip information structure. As shown by the leader hn1, Clip information (XXX.CLPI) comprises "attribute information" relating to video and audio streams, and "EP_map", which is a reference table for cueing ACCESS UNITS.

Attribute information (Attribute), as shown by the leader hn2, comprises attribute information relating to a video stream (Video attribute information), an attribute information number (Number), and attribute information relating to each of a plurality of audio streams multiplexed on the AVClip (Audio attribute information #1-#m). The management information on video streams, as shown by the leader hn3, shows the compression format used to compress the video stream (Coding), and the resolution (Resolution), the aspect ratio (Aspect) and frame rate (Framerate) of individual pieces of picture data structuring the video stream.

On the other hand, Audio attribute information #1-#m relating to the audio stream, as shown by the leader hn4, shows the compression format used to compress the respective audio streams (Coding), and the channel number (Ch.) and corresponding language (Lang.) of respective audio streams.

EP_map (EP_map #1, #2, and #3 in the drawing) is each a reference table for referring indirectly to the addresses of a plurality of cue positions using time information, and, as shown by the leader hn5, comprises a plurality of pieces of exclusion information (ACCESS UNIT #1 entry, ACCESS UNIT #2 entry, ACCESS UNIT #3 entry, . . . ) and an entry number (Number). Each entry, as shown by the leader hn6, shows a playback start time of a corresponding ACCESS UNIT in correspondence with an address and the size (I-size) of the head I-picture in the ACCESS UNIT. The playback start time of an ACCESS UNIT is expressed as a timestamp (presentation timestamp) of picture data positioned at the head of the ACCESS UNIT. Also, the addresses in the ACCESS UNITs are expressed by the serial numbers of TS packets (Source Packet Number or "SPN"). Because of employing a variable-length coding compression format, it is possible to cue from an arbitrary playback time to a piece of picture data in an ACCESS UNIT corresponding to the playback time by referring to the entry of the ACCESS UNIT, even when sizes and playback times of ACCESS UNITs that include GOPs are not uniform. Moreover, the filename "XXX" of XXX.CLPI uses the same name as the AVClip to which the Clip information corresponds. In other words, the filename of AVClip in FIG. 13, being "XXX", corresponds to AVClip (XXX.M2TS). This concludes the description of Clip information. Playlist information is described next.

Figure 14:
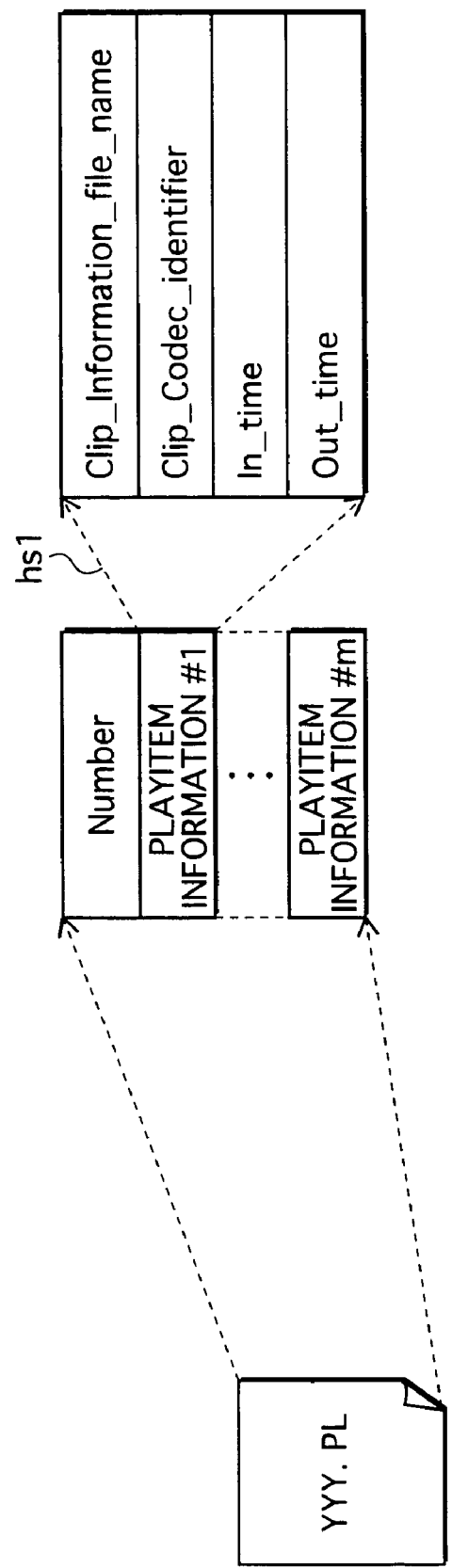
FIG. 14 shows an internal structure of PL information.

YYY.PL (PlayList information) is a table structuring a PlayList, which is playback path information, and comprises plural pieces of PlayItem information (PlayItem information #1, #2, #3, . . . , #m), and a PlayItem information number (Number). FIG. 14 shows an internal structure of PL information. PlayItem information is pointer information that defines one or more playback logical sections structuring a PlayList. The structure of PlayItem information is highlighted by the leader hs1. PlayItem information is, as shown by the leader hs1, structured from a "Clip_information_file_name" showing the filename of playback section information relating to an AVClip to which the In-point and Out-point of a playback section belong, a "Clip_codec_identifier" showing the encoding format used to encode the AVClip, an "In_time", which is time information showing the start of a playback section, and an "Out_time", which is time information showing the end of a playback section.

Figure 15:
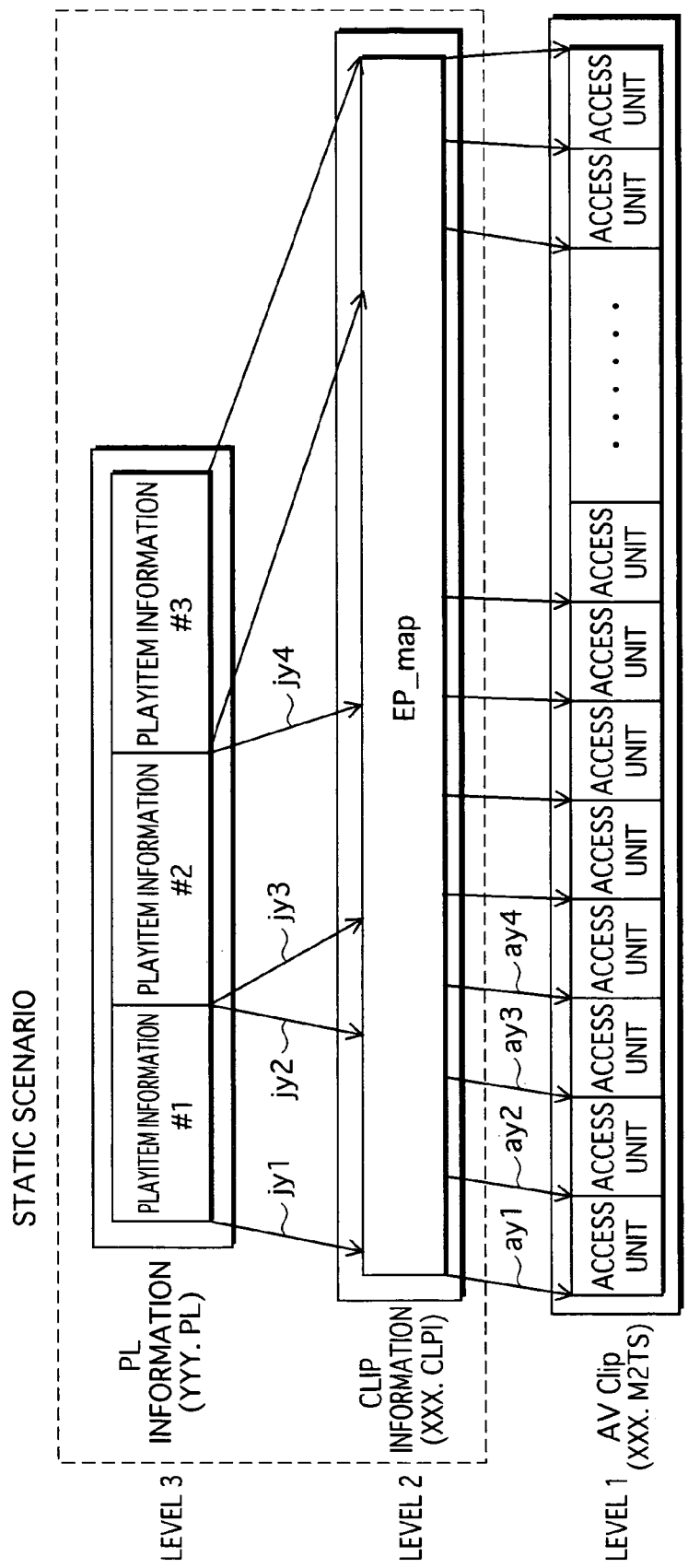
FIG. 15 is a schematic showing indirect referencing using PL information.

A characteristic of PlayItem information is the notation. That is, playback sections are defined by an indirect referencing format that uses an EP_map as a reference table. FIG. 15 schematizes indirect referencing using PL information. The AVClip in FIG. 15 is structured from a plurality of ACCESS UNITs. The EP_map in the Clip information specifies the sector addresses of the ACCESS UNITs, as shown by the arrows ay1, ay2, ay3 and ay4. Arrows jy1, jy2, jy3, and jy4 in FIG. 15 schematically show the referencing of ACCESS UNITs using PlayItem information. In other words, this shows that referencing by PlayItem information (jy1, jy2, jy3, jy4) involves indirect referencing, in which the addresses of ACCESS UNITs included in the AVClip are specified via the EP_map.

Playback sections on a BD-ROM 100 formed from groupings of PlayItem information, Clip information, and AVClips are called "PlayItems". Logical playback units on a BD-ROM 100 that are formed from groupings of PL information, Clip information and AVClips are called "PlayLists" (abbreviated as "PL"). Movie works recorded on a BD-ROM 100 are structured in these logical playback units (PLs). Since movie works on a BD-ROM 100 are structured in logical playback units, it is possible to easily create, as distinct from the main movie work, movie works from scenes in which only certain characters appear, for instance, by defining the PLs specifying only such scenes in which those characters appear.

The greatest merit of static scenarios is being able to increase the range of a moviemaker's expression, since the variations of a movie work increase simply by defining different pieces of PL information. This concludes the description of static scenarios. Dynamic scenarios are described next.

Dynamic Scenarios

Figure 16:
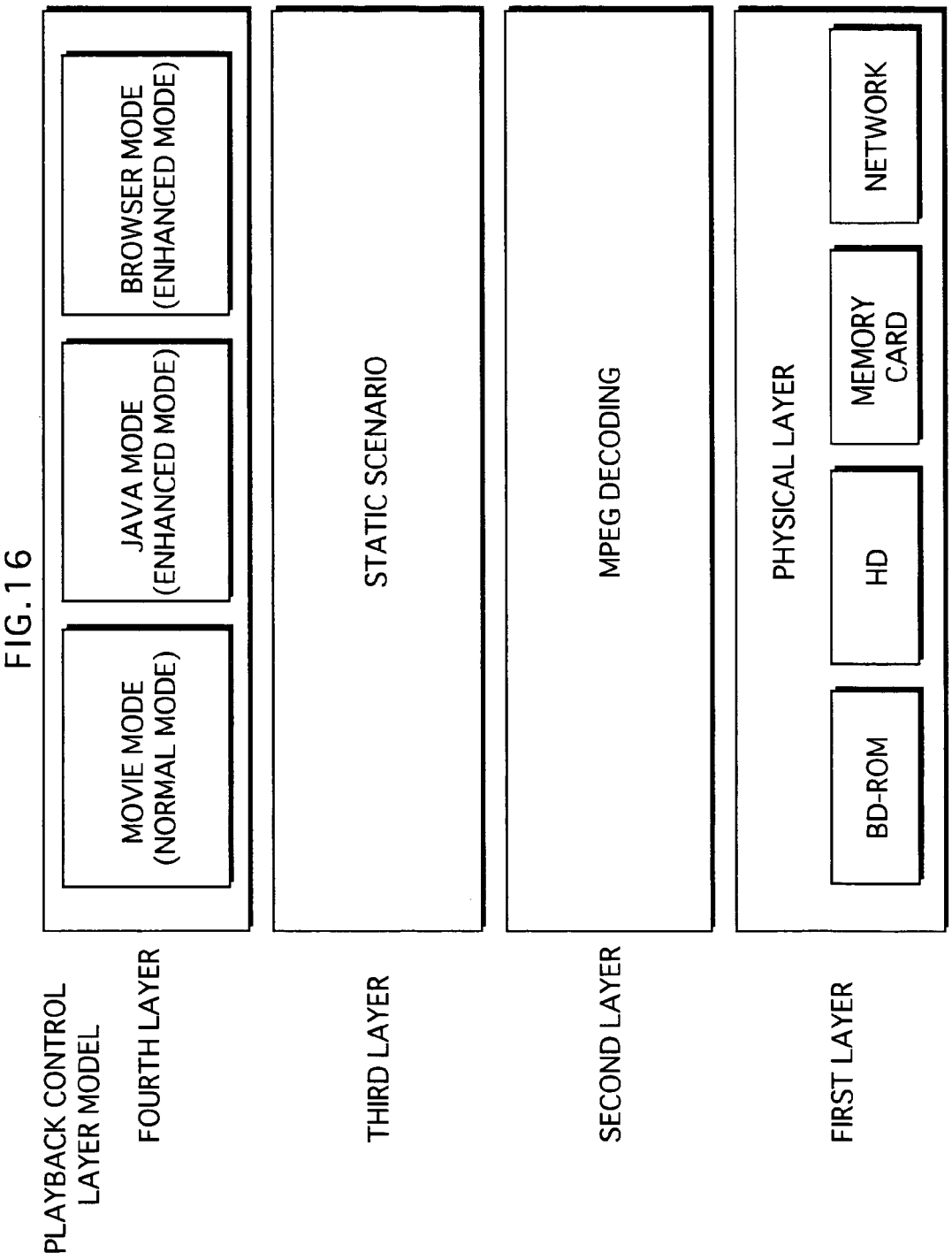
FIG. 16 shows two playback modes in a layer model.

Dynamic scenarios are programs showing playback control of PLs. Playback control with dynamic scenarios changes in response to user operations on the apparatus, and are similar to computer programs in character. Here, dynamic playback controls have two modes. One of the two modes is for playing video data recorded on a BD-ROM 100 in a playback environment specific to AV devices (normal mode), and the other mode is for enhancing the added value of video data recorded on a BD-ROM 100 (enhanced mode). FIG. 16 shows these two playback modes in the layer model. The normal mode shown in FIG. 16, called a MOVIE mode, is a playback mode for a DVD-like playback environment. Of the two enhanced modes, the first, called a Java mode, is a playback mode used mainly with Java virtual machines. The second enhanced mode, called a Browser mode, is a playback mode used mainly with browsers. Since there are three modes on the fourth layer (i.e., the MOVIE mode, Java mode, and Browser mode), it is acceptable if dynamic scenarios are described so that they can be executed in any one of these modes. When it is desirable to describe control procedures using commands that closely resemble DVD-player-oriented commands, it would be preferable to describe playback control procedures in the MOVIE mode. In this way, it is possible to have a playback apparatus execute playback controls that closely resemble those in existing DVD playback apparatuses. When it is desirable to describe control procedures using a page description language, it would be preferable to describe playback control procedures in the Browser mode. As such, it is possible to describe control procedures for accessing network sites, downloading files, and the like. ZZZ.CLASS in FIG. 9 is a Java mode dynamic scenario, ZZZ.HTM is a Browser mode dynamic scenario, and ZZZ.MOVIE is a MOVIE mode dynamic scenario.

Figure 17:
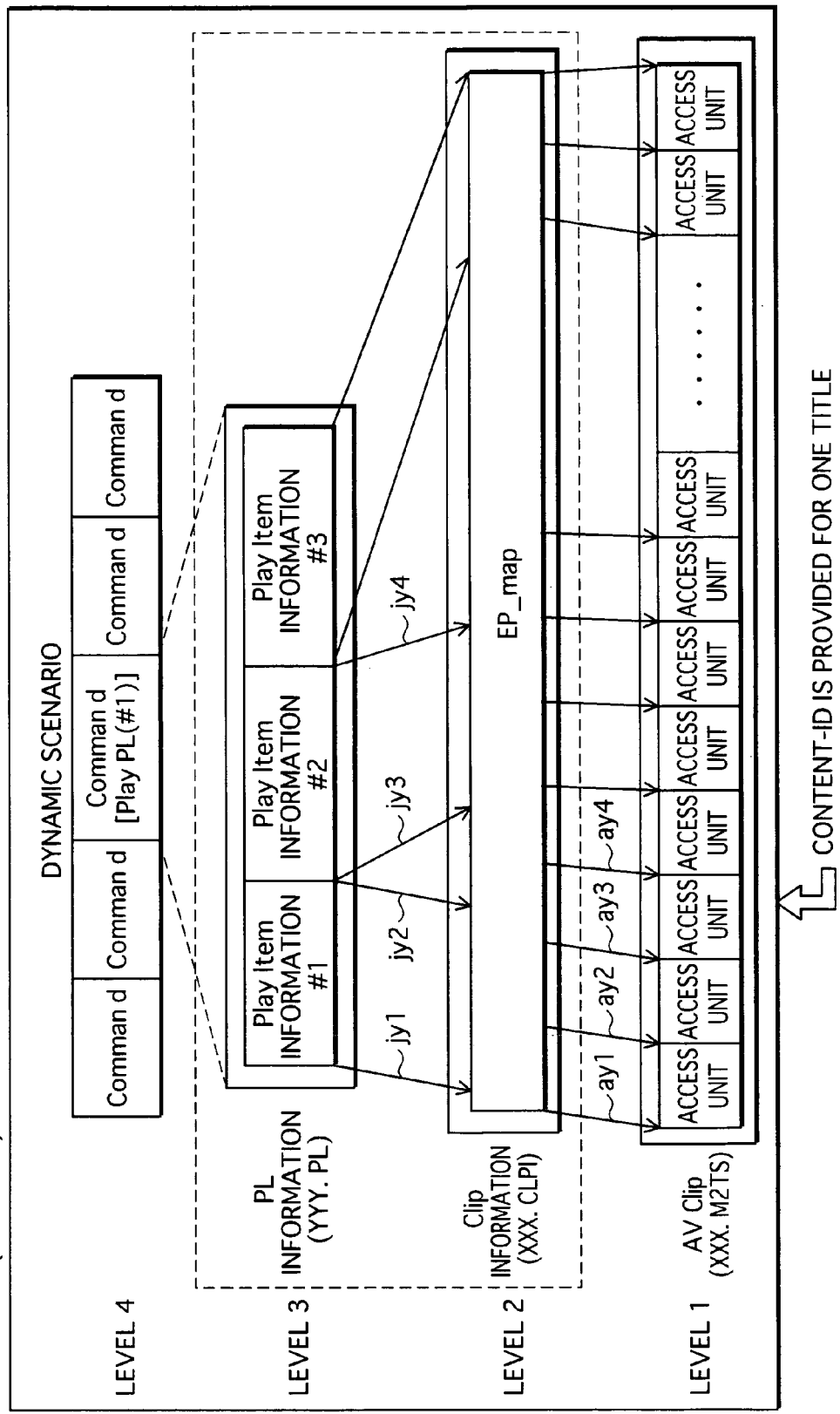
FIG. 17 shows the structure of a Title.

Pairings of one or more dynamic scenarios with PLs whose playback is instructed in the dynamic scenarios are known as "Titles". Titles are units corresponding to the contents on a BD-ROM 100. FIG. 17 shows the structure of a Title. FIG. 17 has the 4$^{th}$ level in addition to FIG. 15. The 4$^{th}$ level, which has been added, shows a dynamic scenario. The dynamic scenario is made up of a plurality of commands (the command sequence in the drawing) and one of the commands includes a command for playing back the PL (PlayPL(#1) in the drawing). The pairing of the dynamic scenario and the PL shown in the drawing is a Title, which corresponds to a content.

The following is explanation on INFO.BD.

INFO.BD is information for integrating/managing dynamic scenarios in MOVIE mode, Java mode, and Browser mode.

Figure 18:
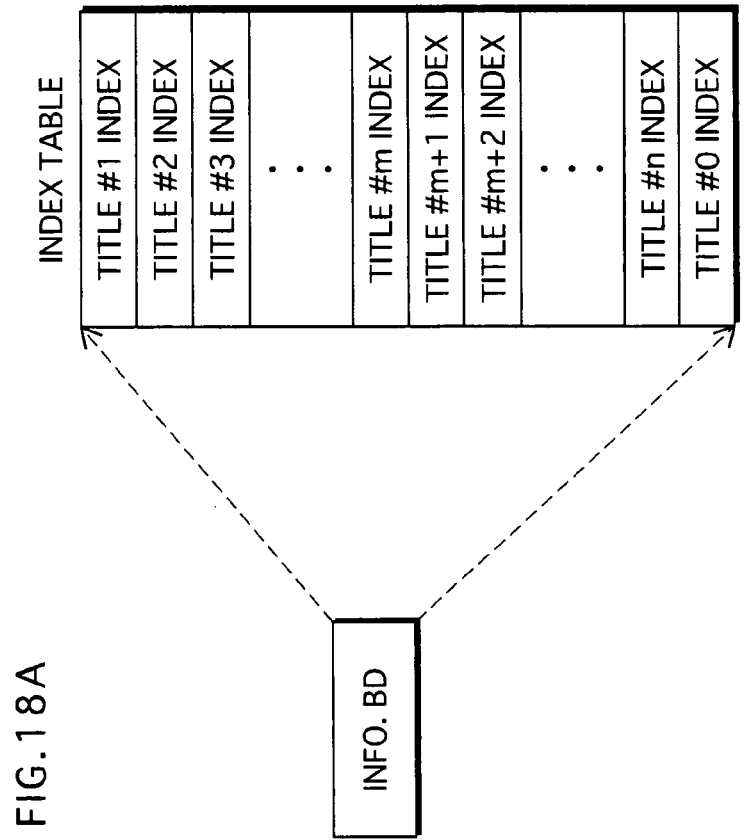
FIG. 18A shows the internal structure of INFO. BD.
FIG. 18B shows what is included in Title #1-#m Indexes.
FIG. 18C shows what is included in Title #m+1-#n Indexes.

FIG. 18A shows an internal structure of INFO.BD. As shown in FIG. 18A, INFO.BD includes an Index Table. The Index Table is an indirect reference table that is referenced when branching from one dynamic scenario to another dynamic scenario, and comprises Indexes corresponding with a plurality of labels. In each Index is described a filename of a dynamic scenario corresponding to the label. The labels include Title#1~#m, Title#m+1~#n, and Title#0. The Index Table is referred to from dynamic scenarios of any of the three modes. Branching from MOVIE objects to Java objects or from MOVIE objects to WebPage objects is only possible when via the Index Table. To rephrase, it is not possible to branch from a MOVIE object to a Java or WebPage object that does not have an Index in the Index Table.

The TITLE#1-#m Indexes relate to the 1$^{st}$ to m$^{th}$ Titles entered in the BD-ROM 100. In these Indexes are described the filenames of MOVIE objects that are to be branch targets when the 1$^{st}$ to m$^{th}$ Title numbers are selected. FIG. 18B shows what is included in TITLE#1~#mIndexes. As shown in FIG. 18B, the filenames of MOVIE objects are described in the Title#1~#m Indexes. Each filename comprises a file body (ZZZ) and an extension (.MOVIE).

The TITLE#m+1~#n Indexes relate to the m+1$^{th}$ to n$^{th}$ Titles entered in the BD-ROM 100. In these Indexes are described the filenames of WebPage objects/Java objects that are to be the branch target when the m+1$^{th}$ to n$^{th}$ Title numbers are selected. FIG. 18C shows the inside of the TITLE#m+1~#n Indexes. As shown in FIG. 18C, in each of Indexes TITLE#m+1~#n is stored either the file body (ZZZ) and extension (.MOVIE) of a Java object or the file body (ZZZ) and extension (.HTM) of a WebPage object. From the explanation above, it is understood that the dynamic scenario used to structure each of the Titles is described in the Indexes of the Index Table. In the present embodiment, a content-ID is indicated in the Index of each Title.

As explained so far, according to the present embodiment, as for a content that has a hierarchical structure with a stream, a static scenario, and a dynamic scenario, the content-ID is described in the Index Table, which integrates/manages the Titles. Therefore, it is possible to make judgment of authorization for each of the Titles on the BD-ROM 100, when the region codes do not match each other.

Third Embodiment

Figure 19:
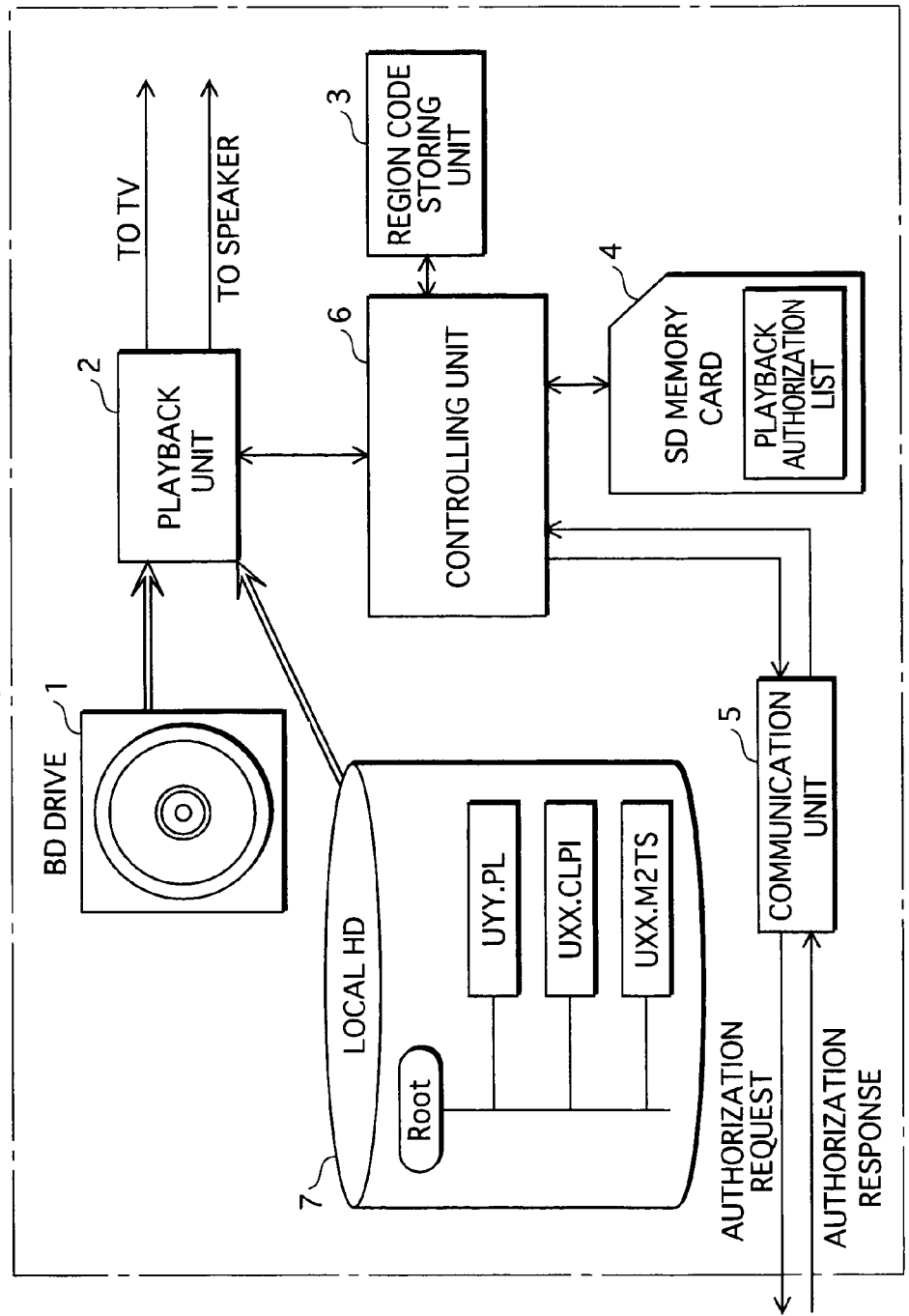
FIG. 19 shows the internal structure of the playback apparatus of the third embodiment.

In this embodiment, when the regions codes do not match each other, and the playback apparatus is allowed to perform an exceptional playback, the playback apparatus is made to download an update kit. The update kit is transmitted so as to accompany an authorization response from the server apparatus. Since the update kit is transmitted so as to accompany an authorization response, the update kit is called accompanying information. FIG. 19 shows the internal structure of the playback apparatus of the third embodiment. Compared to the first embodiment, FIG. 19 is different in that it shows the local HD 7, additionally.

The local HD 7 has an update recorded thereon. The update kit comprises an AVClip (UXX.M2TS), Clip information (UXX.CLPI), and PL information (UYY.PL). The AVClip (UXX.M2TS) in the update kit adds new sound-dubbing audio or subtitles to the AVClip recorded on a BD-ROM 100. The AVClip in the update kit comprises the same number of ACCESS UNITs as the AVClip in the BD-ROM 100. The playback periods of those ACCESS UNITs are the same. The same number of ACCESS UNITS as in the AVClip recorded on the BD-ROM 100 are included in the AVClip in the update kit so that the length of period is the same as the length of period for the ACCESS UNITs in the BD-ROM 100. This way, the ACCESS UNITs in the AVClip recorded on the BD-ROM 100 correspond one-to-one with the ACCESS UNITs of the AVClip in the update kit.

Clip information (UXX.CLPI) relates to AVClips with audio and subtitles only, and is supplied from the server apparatus 500 along with streams with only audio. The Clip information in the update kit is different from the Clip information shown in FIG. 9 in that (i) the video attribute is set as "no Video" since video streams are not multiplexed, and (ii) "Offset" is added to the audio attribute. "Offset" indicates the difference in the timestamps of two AVClips.

The PL information (UYY.PL) in the update kit is to be used in place of the PL information on the BD-ROM 100. The PL information in the present embodiment includes "Audio Entry" and "Subtitle Entry" in addition to the PL information in the second embodiment. "Audio Entry" and "Subtitle Entry" indicate, for the sound-dubbing and subtitles that can be played back with the BD-ROM 100, (i) what the stream is called, (ii) to which AVClip the stream belongs and (iii) from which point to which point in the stream forms a playback section.

Figure 20:
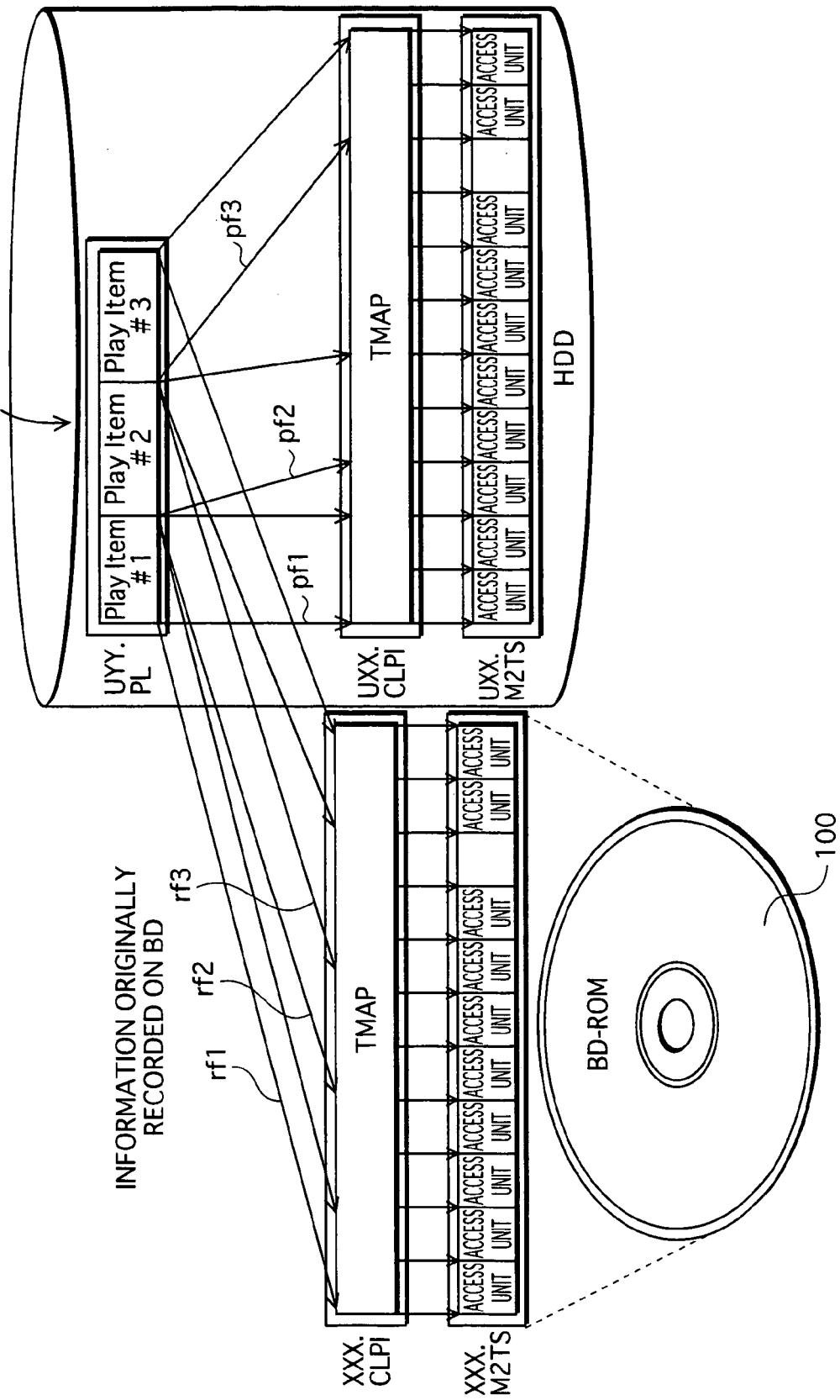
FIG. 20 shows indirect referencing using UYY.PL in the same description manner used in FIG. 15.

FIG. 20 shows indirect referencing using UYY.PL in the same description manner used in FIG. 15. The PL information in the update kit shown in this drawing has Audio Entry. The arrows rf1, rf2, rf3 in the drawing indicate designation of playback sections for the AVClips on the BD-ROM 100. The arrows pf1, pf2, pf3 indicate designation of playback sections by Audio Entry. In other words, each piece of PlayItem information included in the PL information in FIG. 20 designates two playback sections in two AVClips. Since a piece of PlayItem information designates two playback sections, the PL information defines playback paths formed by bundles of playback sections on the BD-ROM 100 and playback sections on the HD. This concludes the description of the update kit stored in the local HD 7. The following explains an improvement on the playback unit 2 in the present embodiment.

The playback unit 2 reads ACCESS UNITs structuring the AVClip recorded on the HD and ACCESS UNITs structuring the AVClip recorded on the BD concurrently, and selectively plays back audio and auxiliary video included in the ACCESS UNITs of one or the other. This selective playback is made based on SPRM. SPRM is a register that shows the state the playback apparatus is in.

FIG. 21 shows how the audio is played back when the outputs are switched by the SPRM. When the audio and subtitles in the ACCESS UNITs on the BD-ROM are played back, what is shown on the left side of FIG. 21 will be played back (i.e., the playback will be accompanied by a line in English, "He had a person at one's nod"). Alternatively, when the audio and subtitles in the ACCESS UNITs on the HD are played back, what is shown on the right side of FIG. 21 will be played back (i.e., the playback will be accompanied by sound-dubbing in Japanese "Kare wa hito o ago de tsukatte iru").

As explained so far, according to the present embodiment, when region codes do not match each other, and an exceptional playback is to be performed, an update kit including audio and subtitles suitable for the region to which the playback apparatus belongs is transmitted, so that the playback apparatus performs playback using the update kit. Therefore, the user is able to view the contents with audio and subtitles that conform to the language of the region in which the user lives.

Fourth Embodiment

In the third embodiment, audio and subtitles are added to a Title recorded on the BD-ROM 100. The fourth embodiment is related to an improvement of partially restricting the playback of a Title recorded on the BD-ROM 100 by transmitting a new piece of PL information, as an update kit, from the server apparatus to the playback apparatus.

Since having a sense of restriction, the PL information in the present embodiment will be referred to as restriction information. The PL information to be transmitted as an update kit in the present information shows, as a playback section, the remaining section after excluding some part from the total section of an AVClip. Further, the PL information has filter information. This filter information prohibits part of audio streams and graphics streams that are multiplexed on AVClips structuring the BD-ROM 100 from being played back. When region codes do not match each other, the server apparatus transmits the PL information to the playback apparatus as an update kit. This way, it is possible to prohibit part of the sections of the AVClips recorded on the BD-ROM 100 or part of the streams multiplexed on the AVClips from being played back.

Fifth Embodiment

In the fifth embodiment, when region codes do not match each other, it is possible to realize an update of dynamic scenarios. The update kit here includes a dynamic scenario. This dynamic scenario will be used in place of the dynamic scenario recorded on the BD-ROM 100. In other words, when a new dynamic scenario exists in an update kit, the new dynamic scenario will be used in place of the dynamic scenario recorded on the BD-ROM 100.

Figure 22A:
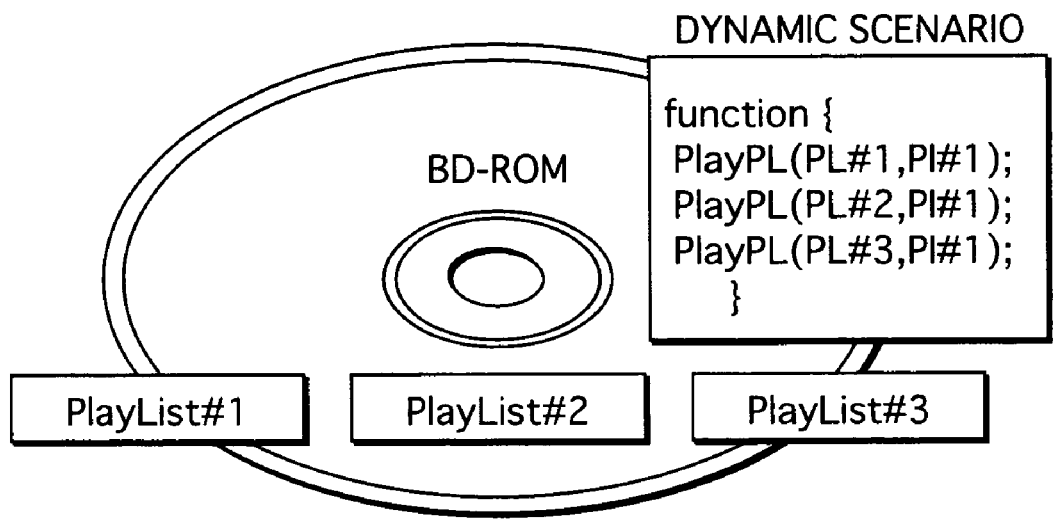
FIG. 22A shows an example of a dynamic scenario.

FIG. 22A shows an example of dynamic scenario. In this example of describing a dynamic scenario, three function callings arranged such as "PlayPL(Pl#1, PI#1)", "PlayPL (PL#2, PI#1)", and "PlayPL(PL#3, PI#1)". Thus, three PLs such as PL#1, PL#2, and PL#3 will be sequentially played so as to structure a movie work.

Figure 22B:
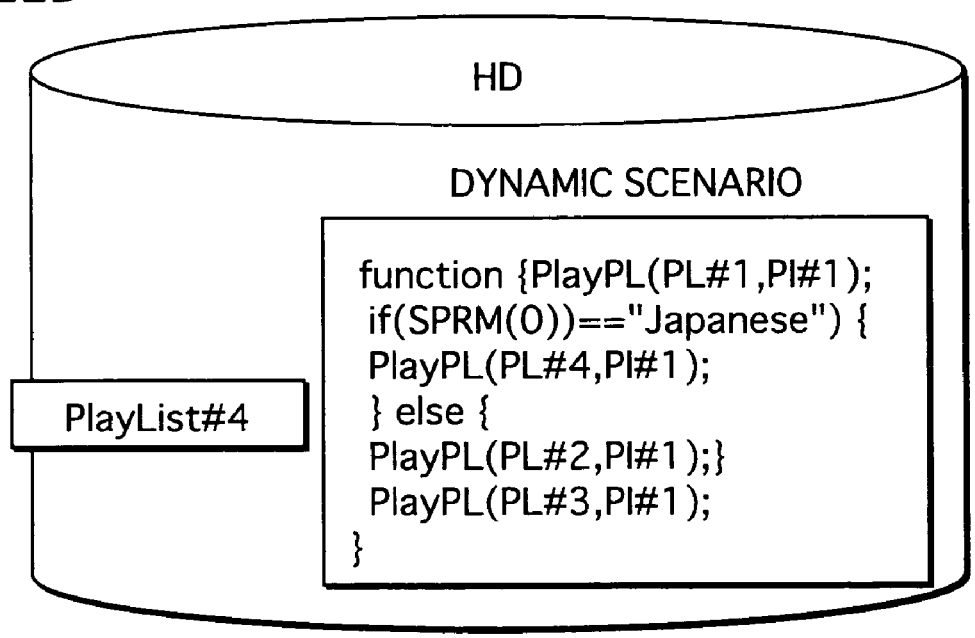
FIG. 22B shows a dynamic scenario to be used in place of the dynamic scenario shown in FIG. 22A.

FIG. 22B shows a dynamic scenario to be used in place of the dynamic scenario shown in FIG. 22A. This dynamic scenario is to be written onto the HD as being incorporated in an update kit. This update kit realizes a "language credit" for switching playback scenes for different languages, and includes an additional PL(PL#4) besides the dynamic scenario. This is a substitute image to be alternatively played back in place of PL#2.

The new dynamic scenario in the update kit realizes conditional playback such that if the language setting (SPRM(0)) in the playback apparatus is "Japanese" (i.e., "if(SPRM(0)) ==Japanese"), the playback section PL#4 is to be played, (i.e., Link(PL#4, PI#1,0)), and if the language setting in the playback apparatus is another language (i.e., "else"), the playback section PL#2 is to be played (i.e., Link(PL#2, PI#1)).

FIG. 23A shows the playback procedure with the dynamic scenario recorded on a BD-ROM 100. FIG. 23B shows the playback procedure with the dynamic scenario included in an update kit. The arrows hb1 and hb2 in FIG. 23B symbolically show the conditional branching that results from the dynamic scenario in the update kit.

As seen from the drawing, the dynamic scenario recorded on the BD-ROM 100 merely causes PL#1, PL#2, and P3 recorded on the BD-ROM 100 to be played back sequentially. The dynamic scenario included in an update kit, however, switches between playing back PL for Japan (PL#4) and playing back PL for the U.S.A. (PL#2), depending on the value of SPRM(0).

As explained so far, according to the present embodiment, when region codes do not match each other and an exceptional playback is to be performed, a dynamic scenario for performing playback procedures suitable for the region to which the playback apparatus belongs is transmitted as an update kit, in order to have the playback apparatus perform playback using the update kit. Therefore, the user is able to view the contents with a playback path that conforms to the language of the region in which the user lives.

Sixth Embodiment

The sixth embodiment is related to an improvement for performing an exceptional playback under a rating system suitable for the region of the playback apparatus 200, when region codes do not match each other, and an exceptional playback is to be performed.

The following explains the actual situations of rating systems in different countries.

In Japan, "EIRIN" (the Commission for the Administration of the Motion Picture Code of Ethics) gives three stages of ratings such as "General", "R", and "Adult" as voluntary restraints. The "General" rating is given to movie works that do not require an age limit. The "R" rating is given to movie works that should not be seen by junior high school students and younger. The "Adult" rating is given to movie works that should not be seen by those who are under 18 years of age. These ratings are given according to the contents of the movies.

In the U.S.A., six stages of ratings such as "G", "PG", "PG-13", "R", "NC-17", and "X" are given by Motion Picture Association of America as voluntary restraints. These ratings are precisely defined as the following: "G" is for general; "PG" is for movie works for which it is preferable to have parent guidance; "PG-13" is for movie works that prefer not being seen by children under 13; "R" is for movie works that should not be seen by those under 17 unless they have an accompanying parent or guardian; "NC-17" is for movie works that should not be seen by those under 17; and "X" is for movie works for adults.

Likewise, other regions also have rating systems of their own. For example, there are five stages of ratings in Germany, three stages of ratings in Italy, and four stages of ratings in Australia.

Because of these different rating systems, it would be preferable not to allow a BD-ROM 100 to be played back in other countries in a case where, for instance, three Japan-oriented versions of a movie are recorded on the BD-ROM 100, because the number of ratings and the levels of ratings are different in other countries.

In order to cope with such differences in the rating systems, when regions codes do not match each other, the playback apparatus 200 of the present embodiment obtains rating information for the region of the playback apparatus 200 from the server apparatus 500 or the SD memory card 4, and performs an exceptional playback using the rating information.

The "rating information" includes group management information and a mapping table.

The "group management information" includes (i) group information that indicates which other PL is in the same group as the PL recorded on the BD-ROM 100 so as to be selectively played back and (ii) level IDs that are attached to PLs in a same group.

The "mapping table" is information for mapping classification levels defined for a region identified with a region code to a level ID. The classification levels mentioned here are individual classifications, such as "Normal level", "R level", and "Adult level" in a case of the Japanese rating system, and "G level", "PG level", and "PG-13 level" in a case of the American rating system, for instance.

After the playback apparatus 200 transmits an authorization request to the server apparatus 500, the rating information is transmitted from the server apparatus along with an authorization response. The rating information is called accompanying information since it is transmitted so as to accompany an authorization response. The rating information is stored into the SD memory card 4 in correspondence with each piece of playback authorization information in the playback authorization list. Since the rating information is transmitted from the server apparatus 500, or is stored in the SD memory card 4, the playback apparatus 200 is able to perform an exceptional playback based on the information.

The following explains the exceptional playback based on the rating information. In the playback apparatus 200, the classification levels of its region are registered. In a playback apparatus 200 of Japan, one of "Normal level", "R level" and "Adult level" is registered. When a BD-ROM 100 sold in a region abroad is loaded into this playback apparatus 200 of Japan, and it is judged that the region codes do not match each other, the playback apparatus 200 transmits an authorization request to the server apparatus. Having obtained the rating information for Japan along with an authorization response, the playback apparatus 200 determines, as its own level ID, one of the plurality of level IDs indicated in the mapping table that conforms to the classification level registered in the playback apparatus.

When playing back a BD-ROM 100, the playback apparatus 200 plays back a PL that corresponds to the level ID of the playback apparatus, out of the plurality of PLs that belong to the group indicated in the group management information. With this arrangement, the playback apparatus 200 is able to perform playback that conforms to one of "Normal level", "R level", and "Adult level", which are peculiar to the Japanese rating system.

As explained so far, according to the present embodiment, even if the movie ethical level in a region identified with the region code of the playback apparatus 200 is more strict than the movie ethical level in a region identified with the region code of the BD-ROM 100, an exceptional playback is performed using the rating information that conforms to the region code of the playback apparatus. Therefore, it is possible to avoid performing playback that would go against the movie ethics in the region of the playback apparatus.

Supplementary Information

The above description by no means shows the implementation of all configurations of the present invention. Implementation of the present invention is still possible according to implementation of configurations that carry out the following modifications (A), (B), (C), and so on. It should be noted, however, that other concrete examples that are included in the invention pertaining to the claims and are at a level that can be executed with technical knowledge from this specification and the drawings or technical knowledge of one of ordinary skill in the art at the time the application is filed are omitted.

(A) The Distribution Company information, the exclusion information and the Release Date information included in the playback authorization information of the first embodiment, as well as Steps S18 to S23 in the flow chart shown in FIG. 6 are elements the addition of which are optional. It is acceptable to make judgment of playback authorization without using these. In other words, it is acceptable to arrange so that the predetermined condition is that the combination of the content and the region code j exists among the combinations in the playback authorization information, and when this condition is satisfied, an authorization for playback is given.

(B) It is arranged so that the region code is written in the lead-in area of a BD-ROM 100 because compatibility with a DVD is concerned. Therefore, the region code may be written in any other place. Alternatively, it is also acceptable when no region code is attached to the BD-ROM 100.

(C) The description is merely optional as to handling a Title as one content, and providing a content ID for an index of a Title in the Index Table. Any units of playback on a BD-ROM 100 could be taken as contents. It is acceptable to attach a content ID to an AVClip itself. Alternatively, it is also acceptable to attach a content ID to the PL information.

(D) It is acceptable to write a sales price of the content in a region to which the playback apparatus 200 belongs so as to be included in the playback authorization information so that an exceptional playback is performed when the bill is paid. The price may be a difference amount from the sales price in a region in which the BD-ROM 100 is sold.

(E) When the BD-ROM 100 being the target of playback is a hybrid disk on which a plurality of contents are recorded, it is acceptable to generate playback authorization information so that only part of the recorded contents are allowed to be played back. With this arrangement, it is possible to record contents that can be distributed in different regions on one BD-ROM 100. Accordingly, it is possible to allow different contents to be played back depending on which region the playback apparatus 200 belongs to.

(F) In all of the embodiments, an optical disk pertaining to the present invention is implemented as a BD-ROM 100. However, the optical disk of the present invention is characterized by the recorded dynamic scenarios and Index Table, and these characteristics are not dependent on the physical properties of a BD-ROM 100. Any form of recording media is applicable as long as there exists the capacity to record dynamic scenarios and Index Tables. For example, optical disks such as DVD-ROM, DVD-RAM, DVD-RW, DVD-R, DVD+RW, DVD+R, CD-R, CD-RW, and the like, and optical-magnetic disks such as PD, MO and the like are applicable. Semiconductor cards such as compact flash cards, Smart Media, Memory Sticks, MultiMedia Cards, and PCM-CIA Cards and the like are also applicable, as are (i) magnetic recording disks such as flexible disks, SuperDisk, Zip, Clik! and the like, and (ii) removable hard disk drives such as ORB, Jaz, SparQ, SyJet, EZFlyer, microdrive and the like. Furthermore, the recording medium may also be a built-in hard disk.

Dynamic scenarios, Index Tables, and PlayList information may be recorded on a different recording medium to AVClips and stream management information. These may then be read in parallel and played as a single video edit.

(G) Although the playback apparatuses in all of the embodiments output AVClips recorded on a BD-ROM 100 to a TV after decoding, the playback apparatus may be structured from only a BD-ROM drive, and the TV may be equipped with all of the other elements. In this case, the playback apparatus and the TV can be incorporated into a home network connected using IEEE1394. Also, although the playback apparatuses in the embodiments are of a type used after connecting to a television, integral display-playback apparatuses are also applicable. Furthermore, the playback apparatus may be only those parts of the playback apparatuses of the embodiments that perform essential parts of the processing. Because these playback apparatuses are all inventions disclosed in the specification of the present application, acts involving the manufacture of playback apparatuses based on an internal structure of the playback apparatuses shown in the first through sixth embodiments are implementations of the inventions disclosed in the specification of the present application. Acts that involve transferring, whether onerous or gratuitous, (retail when cost is involved; a gift when no cost is involved), lending, or importing of playback apparatuses shown in the first through sixth embodiments are also implementations of the present invention. Acts that involve approaching the general user about transfer, rental or the like by means of store front displays, catalogue solicitation, pamphlet distribution and the like are also implementations of these playback apparatuses.

(H) Because of the information processing by computer programs shown in FIGS. 5, 6, and 8 being realized specifically using hardware resources, computer programs showing the processing procedures in the flowcharts form an invention in their own right. Although all of the embodiments show embodiments that relate to the implementation of computer programs pertaining to the present invention in an incorporated form in the playback apparatuses, the computer programs shown in the first through sixth embodiments may be implemented in their own right, separate from the playback apparatuses. The implementation of the computer programs in there own right includes acts that involve: (1) production of the programs, (2) transference of the programs, either onerous or gratuitous (3) lending of the programs, (4) importing of the programs, (5) providing the programs publicly via bi-directional electronic communications circuits, and (6) approaching the general user about transfer, rental and the like by means of store front displays, catalogue solicitation, pamphlet distribution, and so forth.

(I) When recording on a BD-ROM 100, extension headers preferably are appended to TS packets structuring AVClips. The extension headers, which are called TP_extra_header, include an "Arrival_Time_Stamp" and a "copy_permission_indicator", and have a 4-byte data length. TP_extra_header-attached TS packets (hereinafter, abbreviated to "EX-attached TS packet") are arranged into groups of 32 packets, and written into three sectors. Each group comprising 32 EX-attached TS packets is 6,144 bytes in length (=32×192), and matches the 6,144-byte size of three sectors (=2048×3). The grouping of 32 EX-attached TS packets contained in three sectors is referred to as an "Aligned Unit".

A playback apparatus 200 transmits Aligned Units in transmission processing as described below, when used in a home network connected via IEEE1394. That is, a device on the side of the sender removes the TP_extra_header from each of the 32 EX-attached TS packets included in an Aligned Unit, and outputs the TS packets after encoding the TS packet body based on a DTCP standard. When outputting TS packets, isochronous packets are inserted at various positions between TS packets. The positioning of isochronous packets is based on times shown in the Arrival_Time_Stamp in each TP_extra_header. Playback apparatus 200 outputs a DTCP_Descriptor when outputting the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(J) Although digital streams recorded on a recording medium in the embodiments are AVClips, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, or MPEG-AAC format.

(K) Video works in the embodiments may be obtained by encoding analog video signals broadcasted by analog broadcast, or may be stream data constituted from transport streams broadcasted by digital broadcast.

Also, contents may be obtained by encoding analog/digital video signals recorded on videotape. Furthermore, contents may be obtained by encoding analog/digital video signals taken directly from a video camera. Alternatively, the contents may be digital copyrighted works distributed from a distribution server.

(K) In the layer model of a BD-ROM 100, Browser mode and MOVIE mode may be disposed over Java mode. Particularly because of the light burden on the playback apparatus of the execution of control procedures based on dynamic scenarios, the interpretation of dynamic scenarios in MOVIE mode, and the like, no problems arise even when MOVIE mode is executed over Java mode. Also, when developing playback apparatuses and movie works, operation assurance can be dealt with in a single mode.

Furthermore, Java mode processing may be executed only in Java mode, without providing three modes. Since playback controls synchronized with PL playback are possible even in Java mode, the necessity of providing MOVIE mode is removed. Furthermore, controls in dynamic scenario may be only MOVIE mode or only Browser mode.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:
1. A system comprising:
an optical disc having a disc region code assigned thereto and having content and a content identifier identifying the content recorded thereon; and
a playback apparatus for playing back the optical disc, wherein the playback apparatus comprises:
  a memory storing predetermined additional data corresponding to the optical disc, wherein the predetermined additional data includes a substitute playback order of the content recorded on the optical disc and a substitute content, such that a predetermined part of the content recorded on the optical disc is capable of being replaced by the substitute content, and wherein the memory is distinct from the optical disc; and
  a processor programmed to:
    judge whether the disc region code assigned to the optical disc matches an apparatus region code assigned to the playback apparatus;
    read the content identifier of the content recorded on the optical disc;
    judge whether a combination of the content identifier and the apparatus region code satisfies a predetermined condition defined by an owner of rights of the content, if the processor judges that the disc region code does not match the apparatus region code; and
    create a predetermined package based on the substitute play back order of the content by replacing the predetermined part of the content with the substitute content, if the processor judges that the combination of the content identifier read by the processor and the apparatus region code satisfies the predetermined condition defined by the owner of the rights of the content; and
  a playback unit programmed to:
    playback the content, if the processor judges that the disc region code matches the apparatus region code;
    playback the created predetermined package, if the processor judges that the combination of the content identifier and the apparatus region code satisfies the predetermined condition defined by the owner of the rights of the content; and
    prevent playback of the content, if the processor judges that the combination of the content identifier and the apparatus region code does not satisfy the predetermined condition defined by the owner of the rights of the content.

2. The system of claim 1, wherein:
the content recorded on the optical disc of the system includes an AV stream, playlist information, and a dynamic scenario;
the AV stream is a stream obtained by multiplexing a video stream, an audio stream, and a subtitle stream;
the playlist information is information including one or more pairs of start time information and end time information in a playback time axis of the AV stream, each pair of start time information and end time information defining a playback section;
the dynamic scenario is a program that causes the playback apparatus to play back the playlist information;
the predetermined additional data is any of the AV stream, the playlist information, and the dynamic scenario supplied to the playback apparatus via a network; and
the playback of the created predetermined package includes (i) a playback of one of an additional audio stream and an additional subtitle stream that are not recorded on the optical disc of the system, and (ii) a playback of a playback section of the AV stream that is different from the playback section defined by the playlist information of the content of the optical disc of the system.

3. The system of claim 2, wherein:
the playlist information of the content recorded on the optical disc of the system includes a playback authorization setting that indicates which playback of the video stream, the audio stream, and the subtitle stream is authorized or not; and
the created predetermined package includes a playback authorization setting that is different from the playback authorization setting defined by the playlist information of the content recorded on the optical disc of the system.

4. The system of claim 3,
wherein the playback apparatus further comprises a transmitting unit that transmits an authorization request to a server apparatus on a network of an external system, the authorization request indicating the combination of the content identifier read by the processor and the apparatus region code,
wherein, when the predetermined condition is satisfied, the server apparatus transmits an authorization response in reply to the authorization request, and
wherein, when the predetermined condition is not satisfied, the server apparatus transmits a non-authorization response.

5. The system of claim 4, wherein:
the server apparatus includes a playback authorization list including combinations of a content identifier and a region code, each combination indicating that a content identified by a respective content identifier is allowed to be played back in a region identified by a respective region code; and
the predetermined condition is satisfied when the playback authorization list of the server apparatus includes the combination of the content identifier and the apparatus region code indicated by the authorization request transmitted by the transmitting unit of the playback apparatus.

6. The system of claim 4, wherein:
the server apparatus includes a plurality of pieces of date/time information, each piece of date/time information indicating, for a corresponding combination of a content identifier and a region code, a release date/time of a content identified by the content identifier for a region identified by the region code of the corresponding combination;
the authorization request transmitted from the transmitting unit of the playback apparatus to the server apparatus includes a combination of (i) a current time in a region to which the playback apparatus belongs, (ii) the content identifier of the content to be played back, and (iii) the apparatus region code; and
the predetermined condition is satisfied when the current time included in the authorization request is past the release date/time indicated in a piece of date/time information for a corresponding combination of the content identifier and the region code that is the same as the combination of the content identifier and the region code included in the authorization request.

7. The system of claim 4, wherein:
the server apparatus includes a plurality of pieces of distributor information, each piece of distribution information indicating, for a corresponding combination of a content identifier and a region code, a distributor for a region identified by the region code of the corresponding combination;
the authorization request transmitted from the transmitting unit of the playback apparatus to the server apparatus includes a combination of (i) the content identifier of the content to be played back, (ii) the apparatus region code, and (iii) the disc region code; and the predetermined condition is satisfied when a distributor indicated in a first piece of distributor information matches a distributor indicated in a second piece of distribution information, the first piece of distributor information indicating a distributor for a corresponding combination of the content identifier and the apparatus region code that is the same as the combination of the content identifier and the apparatus region code included in the authorization request, and the second piece of distributor information indicating a distributor for a corresponding combination of the content identifier and the disc region code that is the same as the combination of the content identifier and the disc region code included in the authorization request.

* * * * *